(12) United States Patent  
Haga et al.

(10) Patent No.: US 8,522,356 B2  
(45) Date of Patent: Aug. 27, 2013

(54) INFORMATION PROCESSING APPARATUS AND INFORMATION PROCESSING METHOD

(75) Inventors: Tomoyuki Haga, Nara (JP); Hideki Matsushima, Osaka (JP); Manabu Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 127 days.

(21) Appl. No.: 13/379,675

(22) PCT Filed: Apr. 26, 2011

(86) PCT No.: PCT/JP2011/002446
§ 371 (c)(1),
(2), (4) Date: Dec. 21, 2011

(87) PCT Pub. No.: WO2011/142095
PCT Pub. Date: Nov. 17, 2011

(65) Prior Publication Data
US 2012/0117658 A1 May 10, 2012

(30) Foreign Application Priority Data
May 13, 2010 (JP) .................................. 2010-111556

(51) Int. Cl.
*G06F 7/04* (2006.01)
(52) U.S. Cl.
USPC .......................................................... 726/26
(58) Field of Classification Search
USPC ........................................................... 726/26
See application file for complete search history.

(56) References Cited

U.S. PATENT DOCUMENTS

| 7,844,819 B2 * | 11/2010 | Minemura ..................... 713/176 |
| 2007/0226256 A1 | 9/2007 | Imai |

FOREIGN PATENT DOCUMENTS

| JP | 10-333902 | 12/1998 |
| JP | 3293760 | 6/2002 |
| JP | 2004-505343 | 2/2004 |
| JP | 2004-078847 | 3/2004 |
| JP | 2007-241803 | 9/2007 |
| WO | 02/08873 | 1/2002 |

OTHER PUBLICATIONS

International Search Report issued May 24, 2011 in International (PCT) Application No. PCT/JP2011/002446.
TCG Mobile Trusted Module Specification version 1.0 Revision 6 (2008).

(Continued)

*Primary Examiner* — Jacob Lipman
(74) *Attorney, Agent, or Firm* — Wenderoth, Lind & Ponack, L.L.P.

(57) ABSTRACT

The information processing apparatus includes: a tampering determination unit (2501) determining whether or not the shared library in the volatile memory is tampered with; a shared library information holding unit (2504) holding shared library information including information on a correspondence relationship between the shared library and the process; a process control unit (2502), in the case where the determination shows that the shared library in the volatile memory is tampered with, (i) specifying the process which uses the shared library in the volatile memory with reference to the shared library information and (ii) stopping the specified process; and a shared library recovering unit (2505), in the case where the determination shows that the shared library in the volatile memory is tampered with, reloading the shared library in the non-volatile memory into the volatile memory so as to recover the shared library in the volatile memory.

18 Claims, 24 Drawing Sheets

(56) References Cited

OTHER PUBLICATIONS

J. R. Levine, Translated by Kazuya Sakakibara, "Linkers and Loaders" Ohmsha, Ltd., (2001) (with Original English edition "Linkers and Loaders" Morgan Kaufmann Publishers, 2000).

J. B. Rosenberg, Translated by Kunio Yoshikawa, "How Debuggers Work" ASCII Software Language (1998) (with Original English edition "How Debuggers Work" John Wiley & Sons, Inc., 1996).

* cited by examiner

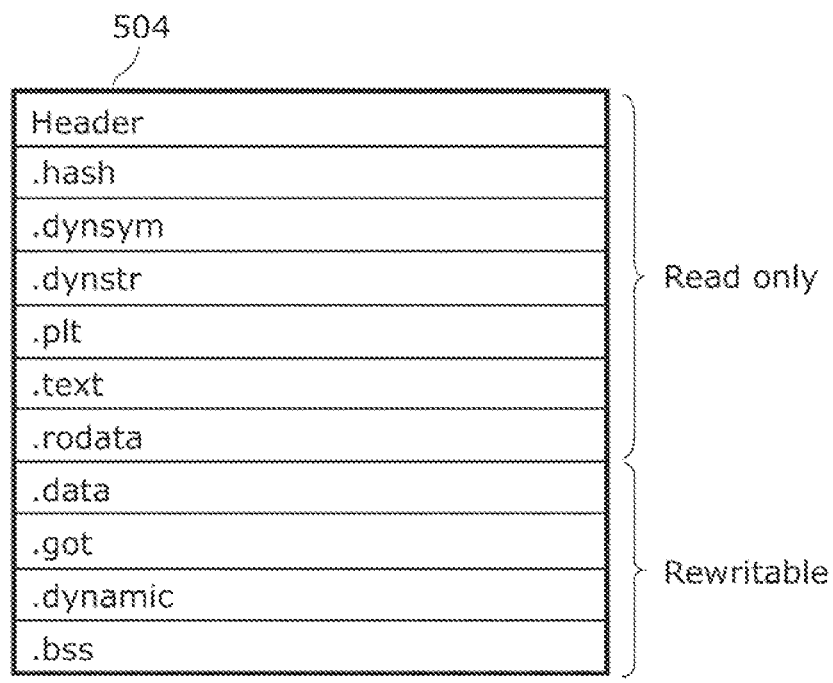

FIG. 9

| To be checked | Reference hash value |
|---|---|
| /system/lib/lib1.so | 0xC32 ... A78 |
| /system/lib/lib2.so | 0x144 ... B9A |
| /system/lib/lib3.so | 0x4A8 ... 712 |
| Signature value ||

508

| To be checked | Start address | Size | Reference hash value |
|---|---|---|---|
| /system/lib/lib1.so | 0xA0000000 | 0x1000 | 0x32A ... 469 |
| /system/lib/lib2.so | 0xA0004000 | 0x2000 | 0xD5F ... AC3 |
| /system/lib/lib3.so | 0xA0008000 | 0x3000 | 0x1A4 ... BD4 |
| Signature value | | | |

| Process ID | Parent process ID | Status |
|---|---|---|
| 1 | 0 | RUN |
| 100 | 1 | RUN |
| 200 | 1 | RUN |
| 300 | 1 | RUN |
| 400 | 300 | RUN |

| Process ID | Parent process ID | Status |
|---|---|---|
| 1 | 0 | RUN |
| 100 | 1 | STOP |
| 200 | 1 | STOP |
| 300 | 1 | RUN |
| 400 | 300 | RUN |

FIG. 15

| Shared library path | Virtual address | Process ID |
|---|---|---|
| /system/lib/lib1.so | 0xA0000000 - 0xA0001000 | 100, 200, 300 |
| /system/lib/lib2.so | 0xA0004000 - 0xA0006000 | 100, 200 |
| /system/lib/lib3.so | 0xA0008000 - 0xA000B000 | 100, 300, 400 |

| Process ID | PC | SP | FP |
|---|---|---|---|
| 100 | 0xA0000334 | 0xB0000030 | 0xB0000038 |
| 200 | 0xA0040108 | 0xB0000080 | 0xB0000088 |

1631

US 8,522,356 B2

INFORMATION PROCESSING APPARATUS AND INFORMATION PROCESSING METHOD

TECHNICAL FIELD

The present invention relates to information processing apparatuses for running a process which uses a shared library, and information processing methods for the information processing apparatuses.

BACKGROUND ART

In recent years, consumer electronics on an open platform have become rapidly widespread. Such consumer electronics can download applications (also referred to as apps), as personal computers (PCs) can. Future consumer electronics will be able to expand their functionality by having various kinds of extra hardware, as PCs do. To make possible the functionality expansion, the consumer electronics need to have device drivers installed.

A PC and a consumer electronic on which a device driver can be installed face a greater thereat than an appliance on which only application software can be installed does. Conventional application software runs in user space. In contrast, the device driver runs in kernel space.

Thus, a malicious user can design malware which runs in kernel mode, distribute the malware as a device driver, and let a legitimate user install the device driver on his or her terminal. Once the malware runs in the kernel mode, the malicious user can pose a threat of freely tampering with a memory in process space.

In order to execute a desired operation, a typical process has a shared library loaded in the process space. The shared library is prepared to be shared by two or more processes.

The shared library is found as a static file in a non-volatile memory. When a process to use the shared library runs, a linker/loader loads the static file in the non-volatile memory into volatile memory. Then, the loaded file is mapped as an executable file in the process space in both of a physical address page and a virtual address page.

Thus, the shared library in the process space is mapped at a certain virtual address. Suppose two or more processes use one single shared library. Even though a virtual address in which the shared library is mapped is different in each of the processes, the physical address corresponding to the virtual address tends to indicate a single region among the processes. This configuration prevents memory waste even though the shared library is loaded in two or more processes.

This configuration, however, could be fraudulently used. Specifically, malware which runs in the kernel mode is fraudulently installed to tamper with a shared library in a process space. Then, the tampering inevitably influences all the processes using the tampered shared library. Suppose, for example, a standard library for accessing a file loaded in a volatile memory is tampered with. In such a case, the tampering affects an application process for reproducing music, images, and pictures from files.

Patent Literature 1 introduces a technique to detect and recover tampered software. In the technique disclosed in Patent Literature 1, an appliance downloads a program stored in a read-only memory (ROM); that is non-volatile memory such as a flash memory, onto a random-access memory (RAM); namely, a volatile memory. Then, the appliance runs the program.

In the case where an error is found in the program in the RAM, the appliance reloads the program from the ROM onto the RAM. In the case where the error is found again in the downloaded program, the appliance switches into another memory bank to directly execute the ROM-stored program.

It is noted that, as conventional techniques, Non Patent Literatures 1 to 3 disclose process controlling techniques.

[Citation List]
[Patent Literature]
[PTL 1]
  Japanese Unexamined Patent Application Publication No. 2004-78847
[Non Patent Literature]
[NPL 1]
  TCG Mobile Trusted Module Specification version 1.0 Revision 6 (2008)
[NPL 2]
  John R. Levine. Translated by Kazuya Sakakibara. "Linkers and Loaders." Ohmsha, Ltd. (2001)
[NPL 3]
  Jonathan B. Rosenberg. Translated by Kunio Yoshikawa. "How Debuggers Work." ASCII Software Language (1998)

SUMMARY OF INVENTION

[Technical Problem]

In the configuration disclosed in Patent Literature 1, suppose the case where the shared library to be used by a program is tampered with. In such a case, the program could not be recovered to run normally.

As described above, the shared library is loaded into the volatile memory. In addition, the program which uses the shared library is also loaded into the volatile memory as a process to run the program. Then, the shared library is mapped in the process space of the process.

Here, suppose an error is found in the shared library loaded into the volatile memory. Even though the program in the non-volatile memory is reloaded into the volatile memory, the shared library loaded into the volatile memory fails to recover.

Furthermore, the reloading of the shared library may influence the operation of a process using the shared library. This could cause to execute an unexpected operation of the process. In addition, even though the shared library is reloaded, the information on the process space would not be changed, leading to a possible failure of the operation of the process.

Moreover, when all the shared libraries and all the programs stored in the non-volatile memory are reloaded into the volatile memory, all the programs are ready to run normally. However, it is inefficient to reload all the programs including un-tampered programs.

The present invention is conceived in view of the above problems and has an object to provide an information processing apparatus which is capable of reducing influence developed when a shared library loaded in a volatile memory is tampered with.

[Solution to Problem]

In order to solve the above problems, an information processing apparatus according to an aspect of the present invention loads a shared library stored in a non-volatile memory into a volatile memory, and runs a process which uses the shared library loaded into the volatile memory. The information processing apparatus includes: a tampering determination unit which determines whether or not the shared library in the volatile memory is tampered with; a shared library information holding unit which holds shared library information including information on a correspondence relationship between the shared library in the volatile memory and the process which uses the shared library in the volatile memory; a process control unit which, in the case where the determination shows that the shared library in the volatile memory is tampered with, (i) specifies the process which uses the shared library in the volatile memory with reference to the shared library information and (ii) stops the specified process; and a shared library recovering unit which, in the case where the determination shows that the shared library in the volatile memory is tampered with, reloads the shared library in the non-volatile memory into the volatile memory so as to recover the shared library in the volatile memory.

This configuration stops only a process affected by a tampered shared library. Then, the shared library in the volatile memory is recovered by the reloaded shared library from the non-volatile memory. Hence, the information processing apparatus of the present invention successfully reduces the effect of tampering.

The process control unit may further resume the process after the recovery of the shared library in the volatile memory.

This operation successfully resumes the stopped process. Thus, the information processing apparatus of the present invention successfully continues running the entire system.

The process control unit may (i) generate stop process information to be used for resuming the process when the process control unit stops the process and (ii) resume the process after the recovery of the shared library in the volatile memory, using the stop process information.

When the process stops, this operation generates information necessary to resume the process. Thus, the process is appropriately resumed.

The process control unit may (i) generate the stop process information including progress information indicating progress of the process when the process control unit stops the process and (ii) resume the process after the recovery of the shared library in the volatile memory, depending on the progress indicated by the stop process information.

This operation resumes the stopped process according to the progress of the process before stop. Thus, the process is resumed in an appropriate state.

The process control unit may generate the stop process information including information on a program counter to be used for the process as the progress information.

This operation allows the information on a program counter to be used as the progress when the process is resumed. Thus, the process is resumed in an appropriate state.

After the recovery of the shared library, the process control unit may (i) resume the process in the progress when the progress indicated by the stop process information shows that the shared library is before use and (ii) resume the process with the shared library made before use when the progress indicated by the stop process information shows that the shared library is in use or after use.

Even though the tampered shared library is used and the process stops, this operation successfully resume the process with the tampered shared library made before use. Thus, the information processing apparatus of the present invention can resume the process without suffering from the tampering.

The process control unit may (i) generate the stop process information including operation history information indicating an operation history of the process when the process control unit stops the process, and when, after the recovery of the shared library, the progress indicated by the stop process information shows that the shared library is in use or after use, (ii) resume the process with the shared library made before use, with reference to the operation history information included in the stop process information.

Thus, using the operation history of the process, the information processing apparatus of the present invention can resume the process without suffering from the tampering.

The process control unit may generate the stop process information including information on a stack to be used for the process as the operation history information.

This operation allows the information on the stack to be used as the operation history in resuming the process. Thus, the process is resumed in an appropriate state.

The information processing apparatus may further include a process running information holding unit which holds process running information indicating whether or not the process is running, wherein the tampering determination unit may (i) specify the process which is running with reference to the process running information and (ii) determine whether or not the shared library which the specified process uses is tampered with.

This operation successfully recovers the shared library to be used by the running process. Hence, the shared library having a great impact on the entire system is successfully recovered more efficiently.

The information processing apparatus may further include a process running information holding unit which holds process running information indicating whether or not the process is running, wherein the process control unit may (i) update the process running information when the process control unit stops the process such that the process running information indicates that the process is not running and, after the recovery of the shared library in the volatile memory, (ii) specify the process which is not running with reference to the process running information and (iii) resume the specified process.

This operation makes sure to specify the process to be resumed. Thus, the process is appropriately resumed.

The information processing apparatus may further include a process running information holding unit which holds process running information indicating whether or not the process is running, wherein the tampering determination unit may (i) specify the process which is running with reference to the process running information and (ii) determine whether or not the shared library which the specified process uses is tampered with, and the process control unit is may (i) update the process running information when the process control unit stops the process such that the process running information indicates that the process is not running and after the recovery of the shared library in the volatile memory, (ii) specify the process which is not running with reference to the process running information and (iii) resume the specified process.

This operation successfully recovers the shared library to be used by the running process. In addition, this operation makes sure to specify the process to be resumed. Hence, an efficient recovery operation is carried out.

The tampering determination unit may determine whether or not the shared library in the volatile memory is tampered with by comparing (i) information previously extracted from the shared library before the shared library is loaded into the volatile memory with (ii) information extracted from the shared library in the volatile memory after the shared library is loaded into the volatile memory.

This operation involves comparing a state of the current shared library and a state of a normal shared library so as to properly detect a tampered shared library.

The tampering determination unit may further determine whether or not the shared library in the non-volatile memory is tampered with, and, in the case where the determination shows that (i) the shared library in the volatile memory is tampered with and (ii) the shared library in the non-volatile memory is not tampered with, the shared library recovering unit may recover the shared library in the volatile memory.

This operation can recover the shared library only when the use of the non-volatile memory is effective in recovering the shared library.

The shared library information holding unit may hold the shared library information including information indicating whether or not determination is made to show whether or not the shared library in the volatile memory is tampered with, and the tampering determination unit may (i) specify the shared library to which the determination is not made with reference to the shared library information and (ii) determine whether or not the specified shared library is tampered with.

This operation eliminates redundant tampering checks and efficiently detects tampering.

When the tampering determination unit determines that the shared library in the volatile memory is tampered with, the shared library recovering unit may recover the shared library in the volatile memory by reloading the shared library in the non-volatile memory into the volatile memory so as to map (i) a physical address of the as shared library reloaded into the volatile memory and (ii) a virtual address of the shared library in a process space of the process.

Here, even though the shared library is loaded in a physical address which differs from the physical address before the reloading, the shared library is appropriately mapped. Accordingly, the shared library is appropriately recovered.

An information processing method according to another aspect of the present invention is for loading a shared library stored in a non-volatile memory into a volatile memory, and running a process which uses the shared library loaded into the volatile memory. The information processing method may include determining whether or not the shared library in the volatile memory is tampered with; in the case where the determining shows that the shared library in the volatile memory is tampered with, (i) specifying the process which uses the shared library in the volatile memory with reference to the shared library information and (ii) stopping the specified process, the shared library information being held in a shared library information holding unit for holding shared library information including information on a corresponding relationship between the shared library in the volatile memory and the process which uses the shared library in the volatile memory; and in the case where the determining shows that the shared library in the volatile memory is tampered with, reloading the shared library in the non-volatile memory into the volatile memory so as to recover the shared library in the volatile memory.

This configuration provides the information processing apparatus of the present invention in a form of an information processing method.

A program according to another aspect of the present invention may cause a computer to execute steps included in the information processing method.

This configuration provides the information processing method of the present invention in a form of a program.

A recording medium according to another aspect of the present invention may be a non-transitory computer-readable recording medium which stores a program for causing a computer to execute steps included in the information processing method.

This configuration provides the information processing method of the present invention in a form of a storage medium.

An integrated circuit according to another aspect of the present invention loads a shared library stored in a non-volatile memory into a volatile memory, and runs a process which uses the shared library loaded into the volatile memory. The integrated circuit may include: a tampering determination unit which determines whether or not the shared library in the volatile memory is tampered with; a process control unit which, in the case where the determination shows that the shared library in the volatile memory is tampered with, (i) specifies the process which uses the shared library in the volatile memory with reference to the shared library information and (ii) stops the specified process, the shared library information being held in a shared library information holding unit for holding shared library information including information on a corresponding relationship between the shared library in the volatile memory and the process which uses the shared library in the volatile memory; and a shared library recovering unit which, in the case where the determination shows that the shared library in the volatile memory is tampered with, reloads the shared library in the non-volatile memory into the volatile memory so as to recover the shared library in the volatile memory.

This configuration provides the information processing apparatus of the present invention in a form of an integrated circuit.

As described above, instead of the information processing apparatus, the present invention may also be provided as a method implementing the characteristic processing units included in the information processing apparatus in the form of steps. Furthermore, the present invention may also be provided as a program which causes a computer to execute the characteristic steps. As a matter of course, such a program may be distributed via a non-volatile storage medium such as a Compact Disc-Read Only (CD-ROM), and a communications network such as the Internet.

Moreover, the present invention may implement part or all of the functions of the information processing apparatus in a form of a Large-Scale Integration (LSI).

Advantageous Effects of Invention

This structure stops only a process affected by a tampered shared library, and successfully reduces the effect developed when a shared library loaded in a volatile memory is tampered with.

BRIEF DESCRIPTION OF DRAWINGS

FIG. 2 shows a sequence diagram when the information processing apparatus according to Embodiment 1 of the present invention is turned on.

FIG. 6 shows a file format of the shared library according to Embodiment 1 of the present invention.

FIG. 7 shows a Prelink map according to Embodiment 1 of the present invention.

FIG. 9 shows a shared library hash list for a non-volatile memory according to Embodiment 1 of the present invention.

FIG. 13 shows process management information according to Embodiment 1 of the present invention.

FIG. 14 shows process management information according to Embodiment 1 of the present invention after tampering is detected.

FIG. 15 shows shared library management information according to Embodiment 1 of the present invention.

FIG. 16 shows stop process context information according to Embodiment 1 of the present invention.

DESCRIPTION OF EMBODIMENTS

Described hereinafter are embodiments of the present invention with reference to the drawings.
[Embodiment 1]

An information processing apparatus according to Embodiment 1 of the present invention detects, while running a process, a tampered shared library among shared libraries loaded in a process space of an application.

When detecting tampering with a shared library, the information processing apparatus stops running a process which id using the tampered shared library. Then, the information processing apparatus reloads a shared library in the non-volatile memory, and recover the tampered shared library. After the recovery, the information processing apparatus resumes the stopped process as well. These operations successfully recover two or more processes which use the tampered shared library.

Figure 1:
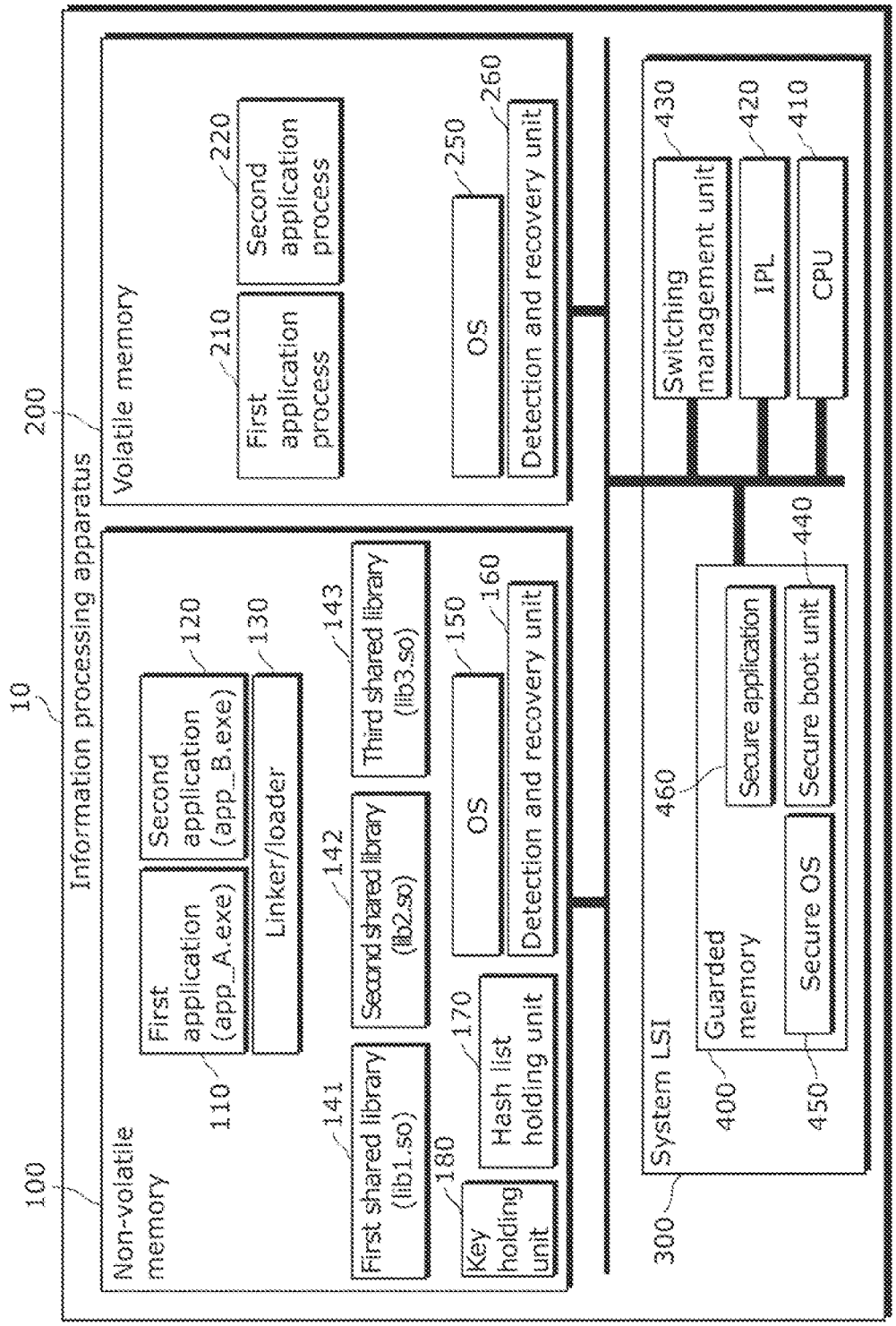
FIG. 1 shows an overall configuration of an information processing apparatus according to Embodiment 1 of the present invention.

Shown first is an overall configuration of the information processing apparatus with reference to FIG. 1.

FIG. 1 shows an overall configuration of the information processing apparatus according to Embodiment 1 of the present invention. FIG. 1 depicts an overall configuration of a running information processing apparatus 10 running a first application process 210 and a second application process 220.

The information processing apparatus 10 includes a non-volatile memory 100, a volatile memory 200, and a system large-scale integration (LSI) 300.

The system LSI 300 is connected to the non-volatile memory 100 and to the volatile memory 200 via an external bus.

Furthermore, the system LSI 300 includes a central processing unit (CPU) 410, an initial program loader (IPL) 420, a switching management unit 430, and a guarded memory 400.

The guarded memory 400 has a secure boot unit 440, a secure operating system (OS) 450, and secure application 460 loaded and stored. The CPU 410 causes the secure boot unit 440, the secure OS 450, and the secure application 460 to operate as functional units.

The non-volatile memory 100 stores a first application 110, a second application 120, a linker/loader 130, a first shared library 141, a second shared library 142, and a third shared library 143. Furthermore, the non-volatile memory 100 stores an OS 150, a detection and recovery unit 160, a hash list holding unit 170, and a key holding unit 180.

The volatile memory 200 stores the first application process 210, the second application process 220, an OS 250, and a detection and recovery unit 260. The CPU 410 causes the first application process 210, the second application process 220, the OS 250, and the detection and recovery unit 260 to operate as functional units.

The detection and recovery unit 160 is capable of detecting tampering with the following items loaded into the volatile memory 200: the first application process 210, the second application process 220, the first shared library 141, the second shared library 142, and the third shared library 143. Then, the detection and recovery unit 160 temporarily stops an application process which is using a tampered shared library.

When detecting the tampering with a shared library, the detection and recovery unit 160 reloads a shared library in the non-volatile memory 100 into the volatile memory 200. This operation allows the detection and recovery unit 160 to recover the shared library into the volatile memory 200. Then, after the recovery, the detection and recovery unit 160 resumes the temporarily stopped application process. Detailed operations of the detection and recovery unit 260 shall be described later with reference to FIGS. 11 to 18.

Figure 3:
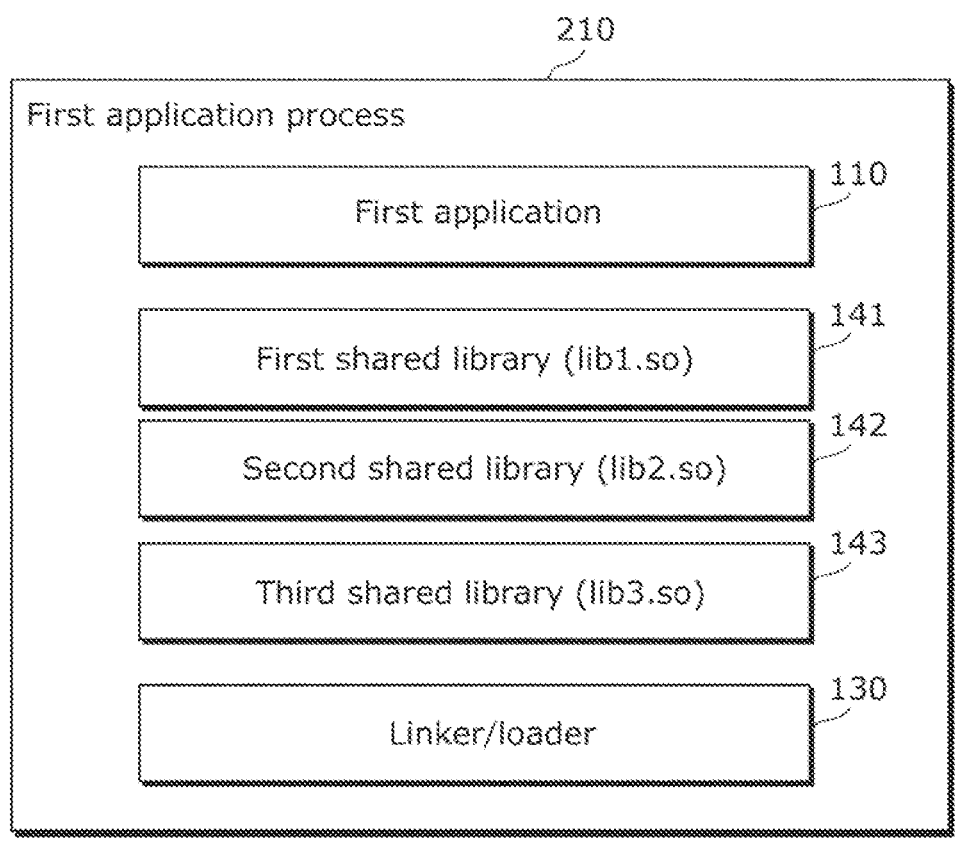
FIG. 3 shows a process space according to Embodiment 1 of the present invention.

The OS 150 and the detection and recovery unit 160 in the non-volatile memory 100 are respectively loaded into the volatile memory 200 as the OS 250 and the detection and recovery unit 260. The CPU 410 causes the OS 250 and the detection and recovery unit 260 to operate as functional units. Moreover, as shown in FIG. 3, the linker/loader 130 in the non-volatile memory 100 is loaded in an application process space of the volatile memory 200. The CPU 410 controls the linker/loader 130 to operate as a functional unit.

The first application 110 and the second application 120 in the non-volatile memory 100 are loaded into the volatile memory 200 to respectively work as the first application process 210 and the second application process 220.

The linker/loader 130 loads, in the process space of the first application process 210, the first shared library 141, the second shared library 142, and the third shared library 143 which are required for an operation of the first application process 210. Similarly, the linker/loader 130 loads, in a process space of the first application process 220, the first shared library 141, the second shared library 142, and the third shared library 143 which are required for an operation of the first application process 220. Details of the process spaces shall be described later with reference to FIG. 3.

The hash list holding unit 170 holds a shared library hash list for a volatile memory. The shared library hash list for a volatile memory contains reference hash values of the first shared library 141, the second shared library 142, and the third shared library 143 which are loaded into the volatile memory 200. Later, the list shall be detailed with reference to FIG. 10.

The hash list holding unit 170 also holds a shared library hash list for a non-volatile memory. The shared library hash list for a non-volatile memory contains reference hash values of the first shared library 141, the second shared library 142, and the third shared library 143 which are loaded into the volatile memory 100. Later, the list shall be detailed with reference to FIG. 9.

In addition, the hash list holding unit 170 holds, between the power-on of the information processing apparatus 10 and the application activated, a list (not shown) recording the reference hash values of each software program (the secure boot unit 440, the secure OS 450, the secure application 460, the OS 150, and the detection and recovery unit 160). Each of hash lists held in the hash list holding unit 170 has signature in order to show that the hash list has its data integrity verified.

The key holding unit 180 holds a signature verification key to be used for verifying the signature on a hash list. The signature here is offered using a digital signature scheme based on the public key cryptosystem. The key holding unit 180 holds a key corresponding to a public key in the public key cryptosystem.

Described next is how secure boot is provided between the power-on of the information processing apparatus 10 and the application activated, with reference to FIG. 2.

Figure 2:
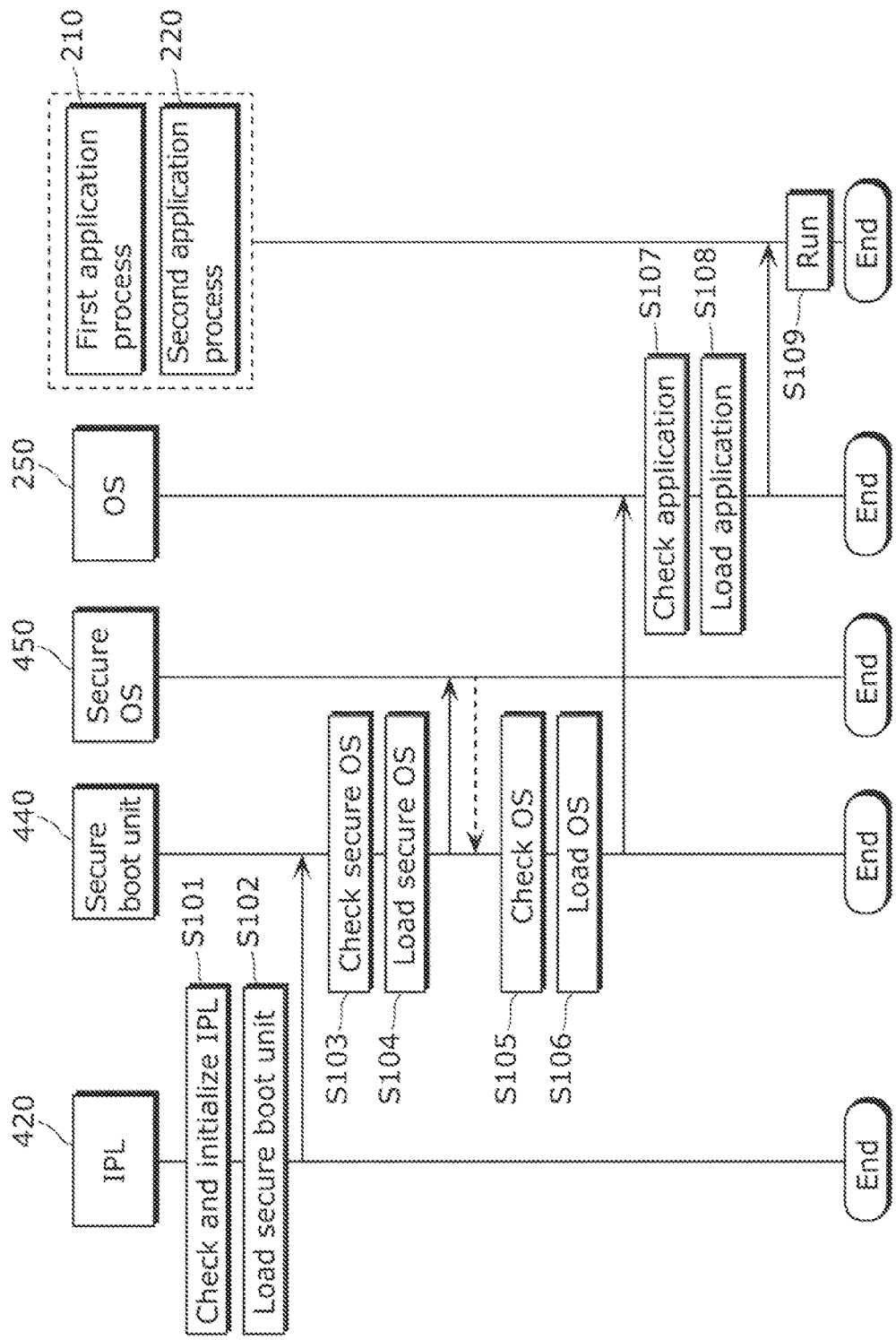

FIG. 2 shows a sequence diagram when the information processing apparatus 10 according to Embodiment 1 of the present invention is turned on. The sequence is between the power-on and the application activated.

When the power is turned on, the information processing apparatus 10 activates the IPL 420 in the system LSI 300.

The IPL 420 uses a hash list for secure boot (not shown) to check whether or not the IPL 420 itself is not tampered with. Then, the IPL 420 initializes the guarded memory 400, the switching management unit 430, and not-shown peripheral circuitry (S101). After the initialization, the IPL 420 uses the hash list for secure boot to check whether or not the secure boot unit 440 is tampered with. In the case where the secure boot unit 440 is not tampered with, the IPL 420 loads the secure boot unit 440 (S102).

Next, the secure boot unit 440 uses the hash list for secure boot to check whether or not the secure OS 450 is tampered with (S103). When the check (S103) verifies that the secure OS 450 is not tampered with, the secure boot unit 440 loads the secure OS 450 (S104).

Even though not shown, the secure OS 450 loads the secure application 460 in the case where the OS 250 requests the switching management unit 430 to activate the secure application 460. Before loading the secure application 460, the secure OS 450 uses the hash list for secure boot to check whether or not the secure application 460 is tampered with. In the case where the secure application 460 is not tampered with, the secure OS 450 loads the secure application 460.

After loading the secure OS 450, the secure boot unit 440 uses the hash list for secure boot to check whether or not the OS 150 of the non-volatile memory 100 is tampered with (S105). When the check (S105) verifies that the OS 150 of the non-volatile memory 100 is not tampered with, the secure boot unit 440 loads the OS 150 of the non-volatile memory 100 as the OS 250 of the volatile memory 200 (S106).

Then, when requesting activation of the application, the OS 250 loaded into the volatile memory 200 uses the hash list for secure boot to check whether or not a first application 110 and a second application 120 in the non-volatile memory 100 are tampered with (S107).

When the check (S107) verifies that the first application 110 and the second application 120 in the non-volatile memory 100 are not tampered with, the OS 250 loads the first application 110 in the non-volatile memory 100 as the first application process 210 into the volatile memory 200. Similarly, the OS 250 loads the second application 120 of the non-volatile memory 100 as the second application process 220 of the volatile memory 200 (S108). Here, the shared library to be used in a process may be loaded either in activating the process or dynamically.

After the first application 110 and the second application 120 are respectively loaded as the first application process 210 and the second application process 220, the first application process 210 and the second application process 220 are run (S109).

Even though it is not shown, the OS 250 checks the detection and recovery unit 160 whether or not the detection and recovery unit 160 is tampered with, as well as the first application 110 and the second application 120.

Furthermore, the booting is canceled when the checks (S103, S105, and S107) determine that tampering is found.

Moreover, the hash list for secure boot has its signature checked with the public key held in the key holding unit 180. Then, only when the signature is verified authentic, the IPL 420, the secure boot unit 440, and the secure OS 450 check tampering. In contrast, when the signature on the hash list is proven false, the IPL 420, the secure boot unit 440, and the secure OS 450 cancels booting.

In addition, the secure boot included in the above process may be a secure boot defined by the Mobile Phone Work Group (MPWG) in the Trusted Computing Group (TCG) in Non-Patent Reference 1.

Moreover, the secure boot unit 440, the secure OS 450, and the secure application 460 may be held in the system LSI 300 as static data before they are loaded. Such static data may be encrypted with a system private key generated by the information processing apparatus 10, and recorded in the non-volatile memory 100. Then, the data may be decrypted with the system private key, and loaded in the guarded memory 400.

That ends the details of the flowchart between the power-on and the application activated.

FIG. 3 shows the process space of the first application process 210 in FIG. 1.

In the process space, there are a kernel space and a user space in general. FIG. 3 shows the user space only.

The example in FIG. 3 shows that the first application process 210 uses the features of the first shared library 141 (lib1. so), the second shared library 142 (lib2. so), and the third shared library 143 (lib3. so).

Here, the first application 110, the first shared library 141 (lib1. so), the second shared library 142 (lib2. so), the third shared library 143 (lib3. so), and the linker/loader 130 are loaded into the volatile memory 200. Then, they are mapped in the virtual address space of the first application process 210.

The linker/loader 130 is capable of loading a shared library required for the first application process 210 to execute a desired operation. Patent Reference 2 "Linkers and Loaders" details more about the operations of the linker/loader 130.

It is noted that, in the virtual address space of the first application process 210, the first application 110 and the first shared library 141 (lib1. so) in the non-volatile memory 100 may be mapped.

Figure 4:
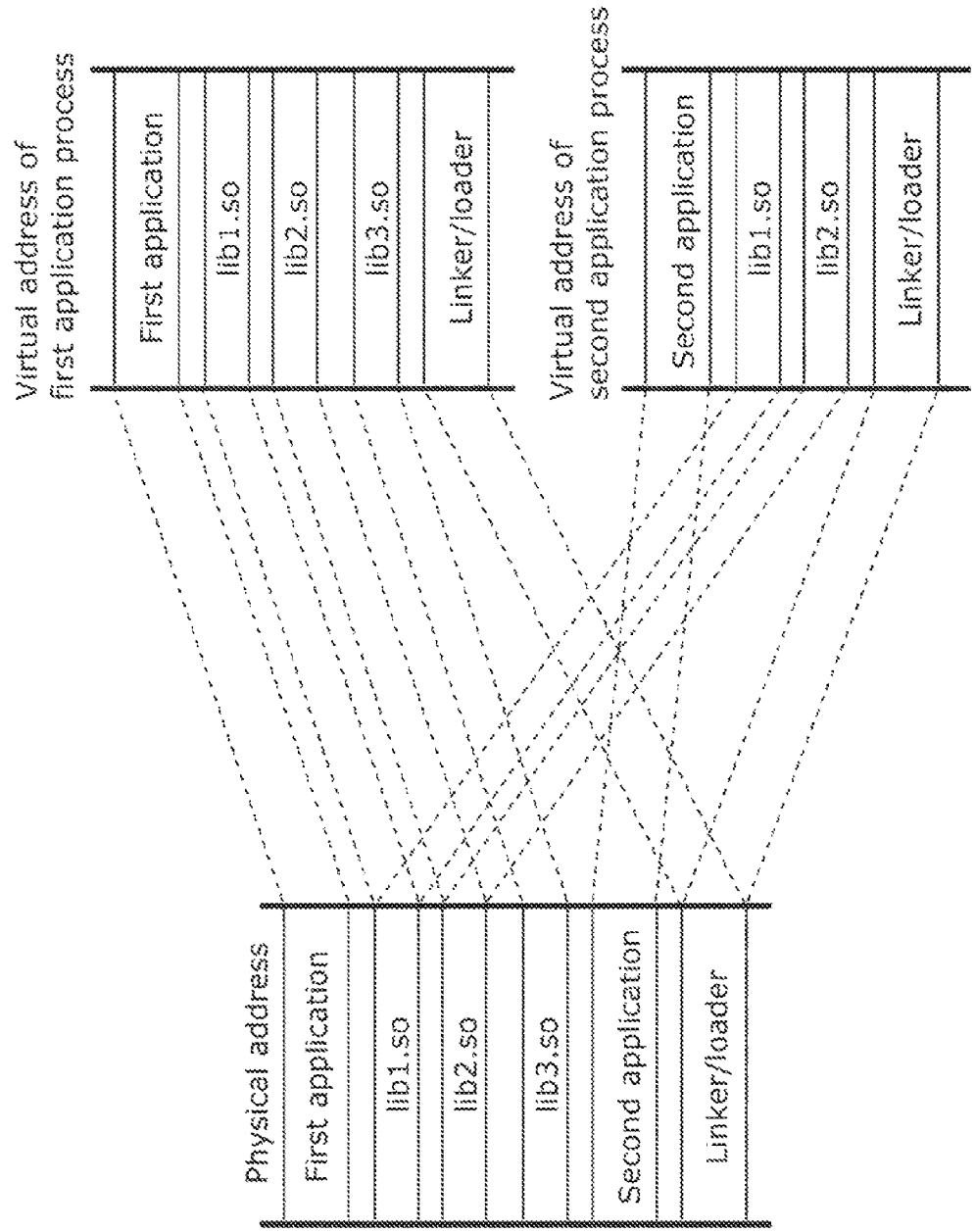
FIG. 4 shows a map of a shared library in the process space according to Embodiment 1 of the present invention.

FIG. 4 shows a relationship between a virtual address and the physical address in each process space of the first application process 210 and the second application process 220.

The shared library is prepared to be shared by two or more processes. As shown in FIG. 4, the first shared library 141, the second shared library 142, and the third shared library 143 are used among the processes. Here, the first shared library 141, the second shared library 142, and the third shared library 143 are stored in non-volatile memory 100 in a form of file. The linker/loader 130 loads the first shared library 141, the second shared library 142, and the third shared library 143 in a page of the physical address of the volatile memory 200.

The first shared library 141, the second shared library 142, and the third shared library 143 are formed in object file by an after-described compiler and linker. A text section; that is an executable code of each shared library, is loaded in a page having an executable attribute, assigned. A data section; that is a rewritable data area in each shared library, is loaded in a page having a rewritable attribute assigned. The details of the object file format shall be described later with reference to FIG. 6.

FIG. 4 shows that the first shared library 141 (lib1. so) and the second shared library 142 (lib2. so) are found in both of the virtual address spaces of the first application process 210 and the second application process 220. In the first shared library 141 (lib1. so) and the second shared library 142 (lib2. so) in the corresponding virtual address spaces, lib1. so and lib2. so in the physical address are mapped.

Thus, the tampering by malware with lib1. so and lib2. so in the physical address influences the first application process 210 and the second application process 220. Later, FIGS. 11 to 18 shows how a tampered shared library is recovered.

Figure 5:
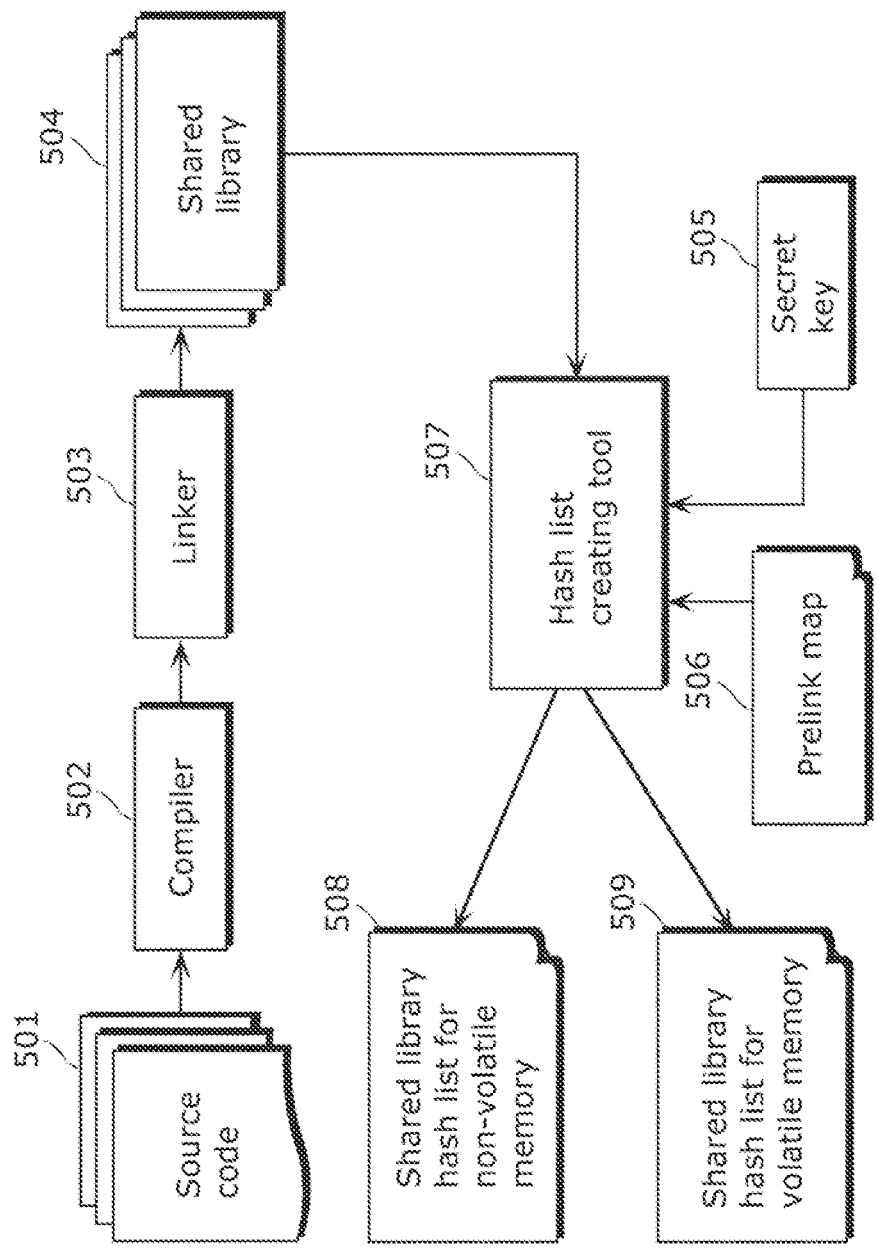
FIG. 5 shows how a hash list according to Embodiment 1 of the present invention is created.

FIG. 5 shows an overview of how to generate a shared library hash list for a non-volatile memory 508 and a shared library hash list for a volatile memory 509 which are held in the hash list holding unit 170.

A compiler 502 compiles source code 501 of a shared library 504 to generate object code. A linker 503 links the generated object code to a needed library. In other words, the linker 503 adds the needed library to the object code. Then, as the shared library 504, the linker 503 outputs the object code with the needed library added.

A hash list creating tool 507 operates on a development machine. The hash list creating tool 507 receives the shared library 504, a secret key 505, and a prelink map 506, and outputs a shared library for a non-volatile memory 508, and a shared library hash list for a volatile memory 509.

Specifically, the hash list creating tool 507 generates reference hash values of the shared library 504. Then, the hash list creating tool 507 lists the reference hash values to create the shared library hash list for a non-volatile memory 508 and the shared library hash list for a volatile memory 509. Then, the hash list creating tool 507 uses the secret key 505 to give signatures to the shared library hash list for a non-volatile memory 508 and the shared library hash list for a volatile memory 509.

Detailed operations in the hash list creating tool 507 shall be described later, with reference to FIG. 8.

It is noted that the information processing apparatus 10 in FIG. 1 may include each of the functional units in FIG. 5 to generate the shared library for a non-volatile memory 508 and the shared library hash list for a volatile memory 509. Another apparatus, such as a development machine, may also generate the shared library for a non-volatile memory 508 and the shared library hash list for a volatile memory 509.

FIG. 6 shows a file format of the shared library 504 in FIG. 5. FIG. 6 presents the shared library 504 formed in object file in the Executable and Linkable Format (ELF). The details are described in Non-Patent Reference 2 "Linkers and Loaders".

The shared library 504 includes two or more sections. Each of the sections has either a read attribute or a write attribute, or has both of a read attribute and a write attribute. A section having the read attribute only is designated for reading. A section having both of the read attribute and the write attribute is rewritable.

Among the sections in FIG. 6, each of the sections having "header", ".hash", ".dynsym", ".dynstr", ".plt", ".text", ".rodata", ".data", ".got", ".dynamic", and ".bss" is read only. In contrast, among the sections in FIG. 6, each of the sections having ".data", ".got", ".dynamic", and ".bss" is rewritable.

The first shared library 141, the second shared library 142, and the third shared library 143 are stored in the file formats shown in FIG. 6. When loaded into the volatile memory 200, a read-only attribute is assigned to each of the read-only sections. Then, the read-only sections are mapped in a physical page and a virtual page. When loaded into the volatile memory 200, both of a read-only attribute and a write attribute are assigned to each of the rewritable sections. Then, the rewritable sections are mapped in a physical page and a virtual page.

FIG. 7 shows the prelink map 506 to be inputted in the hash list creating tool 507 in FIG. 5.

The prelink map 506 is a file containing a library name and a map address. The example in FIG. 7 shows that the first shared library 141 has the file name of lib1. so. The map address of lib1. so is 0xA0000000. Thus, lib1. so is mapped in 0xA0000000 in a virtual address space of a process.

Similar to the first shared library 141, lib2. so of the second shared library 142 is mapped in 0xA0004000 in the virtual address space. Furthermore, lib3. so of the third shared library 143 is mapped in 0xA0008000 in the virtual address space.

Figure 8:
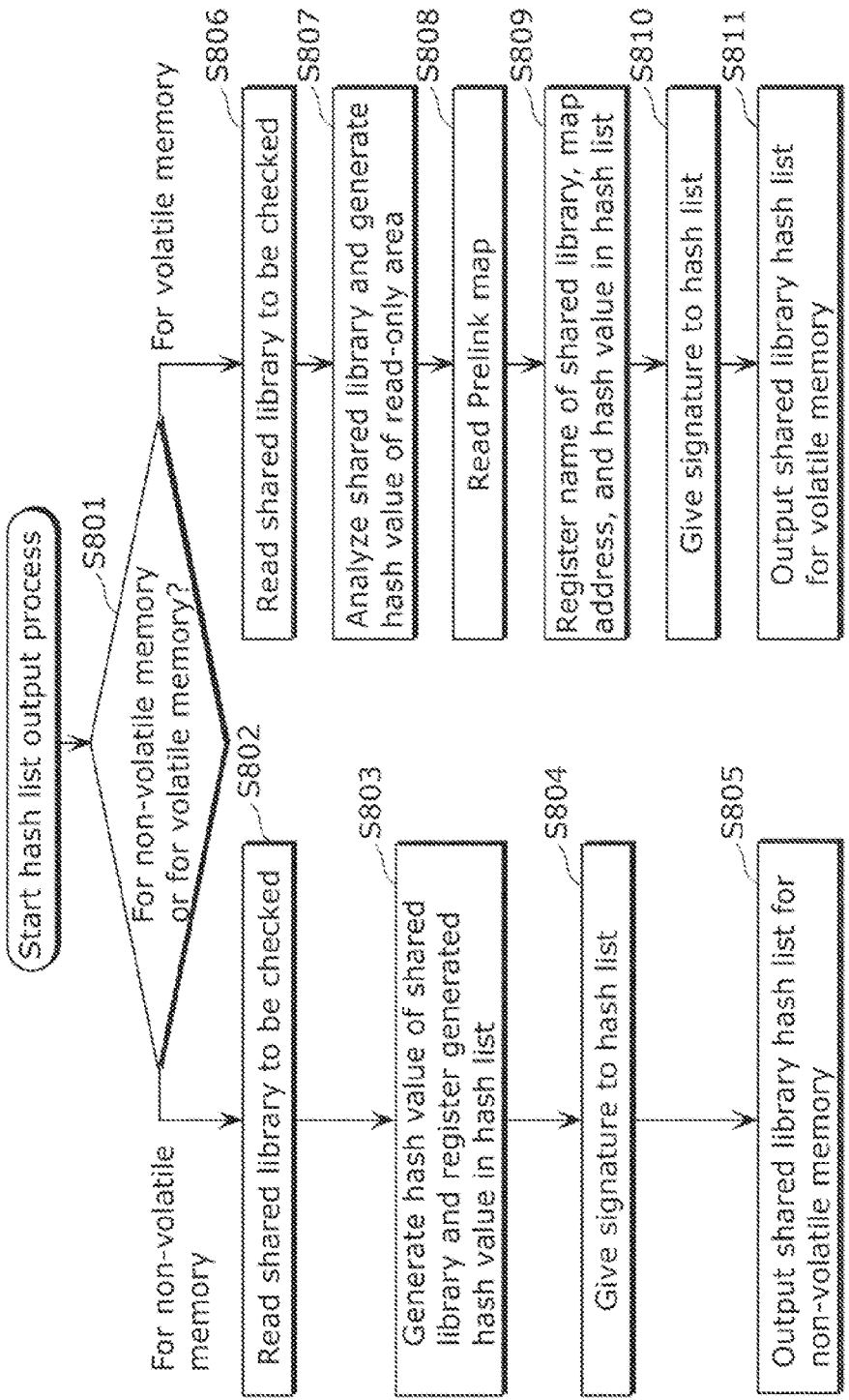
FIG. 8 depicts a flowchart showing how the hash list according to Embodiment 1 of the present invention is created.

FIG. 8 depicts a flowchart showing how the hash list creating tool 507 creates a hash list. Here, the shared library 504, the secret key 505, and the prelink map 506 are inputted. One of the shared library for a non-volatile memory 508 and the shared library hash list for a volatile memory 509 is outputted.

First, the hash list creating tool 507 determines in which mode the hash list creating tool 507 operates: the mode in creating the shared library hash list for a non-volatile memory 508 or the mode in creating the shared library hash list for a volatile memory 509 (S801). Even though not shown, either of the creating modes may be inputted into the hash list creating tool 507 to make the determination.

Suppose the result of the mode determination (S801) indicates creation of the shared library hash list for a non-volatile memory 508: The hash list creating tool 507 reads, into the non-volatile memory 100, the shared library 504 to be checked for tampering (S802).

Next, the hash list creating tool 507 calculates hash values of the shared library 504 which has been read in the previous step (S802). Then, the hash list creating tool 507 registers the calculated hash values as reference hash values in the shared library hash list for a non-volatile memory 508 (S803).

Next, the hash list creating tool 507 gives a signature with the inputted secret key 505 to the shared library hash list for a non-volatile memory 508 (S804).

Finally, the hash list creating tool 507 outputs the shared library hash list for a non-volatile memory 508 (S805).

There is another process which starts at the mode determination step (S801).

Suppose the result of the mode determination (S801) indicates creation of the shared library hash list for a volatile memory 509: The hash list creating tool 507 reads, into the volatile memory 200, the shared library 504 to be checked for tampering (S806).

Next, according to a file format, the hash list creating tool 507 analyzes the shared library 504 read in the previous step (S806), and calculates hash values of a read-only area as reference hash values (S807).

In Embodiment 1, the hash list creating tool 507 analyzes the object file in the Executable and Linkable Format (ELF) shown in FIG. 6, and generates hash values for the read-only area in the. ELF.

Then, the hash list creating tool 507 reads the prelink map 506 (S808).

Next, the hash list creating tool 507 registers, in the shared library hash list for a volatile memory 509, the name of the shared to library, the map address, and the hash values (S809). Here, the name is the name of a shared library to be checked for tampering. At the map address, the shared library 504 is mapped at the virtual address. The hash values are calculated as the reference hash values.

Next, the hash list creating tool 507 gives a signature with the inputted secret key 505 to the shared library hash list for a non-volatile memory 509 (S810).

Finally, the hash list creating tool 507 outputs the shared library hash list for a volatile memory 509 (S811).

It is noted that a hash algorithm to be used for calculating the hash values may be a hash function; namely a one-way function, including SHA1, SHA2, MD4, and MD5.

Furthermore, the signature scheme to be employed for implementing a signature may be a typical digital signature scheme including the RSA system, the ElGamal system, and the DSA system.

In addition, the hash list creating tool 507 may skip a relocated part and calculate the hash values, when calculating the hash values of the read-only area in the step (S807) generating the hash values for a volatile memory.

Moreover, the hash list creating tool 507 may register the size of the shared library 504 when registering each of the hash lists (S803 and 5804). Then, the hash list creating tool 507 may register, in the shared library hash list for a volatile memory 509, the size of the read-only area as the size of the shared library 504.

FIG. 9 specifically shows the shared library for a non-volatile memory 508 in FIG. 5. The shared library for a non-volatile memory 508 in FIG. 9 contains the name of a shared library to be checked and the reference hash values. Here, the reference hash values are the ones calculated in the hash values generating step in FIG. 8 (S803).

The shared library for a non-volatile memory 508 has a signature given with the secret key 505.

Figure 10:
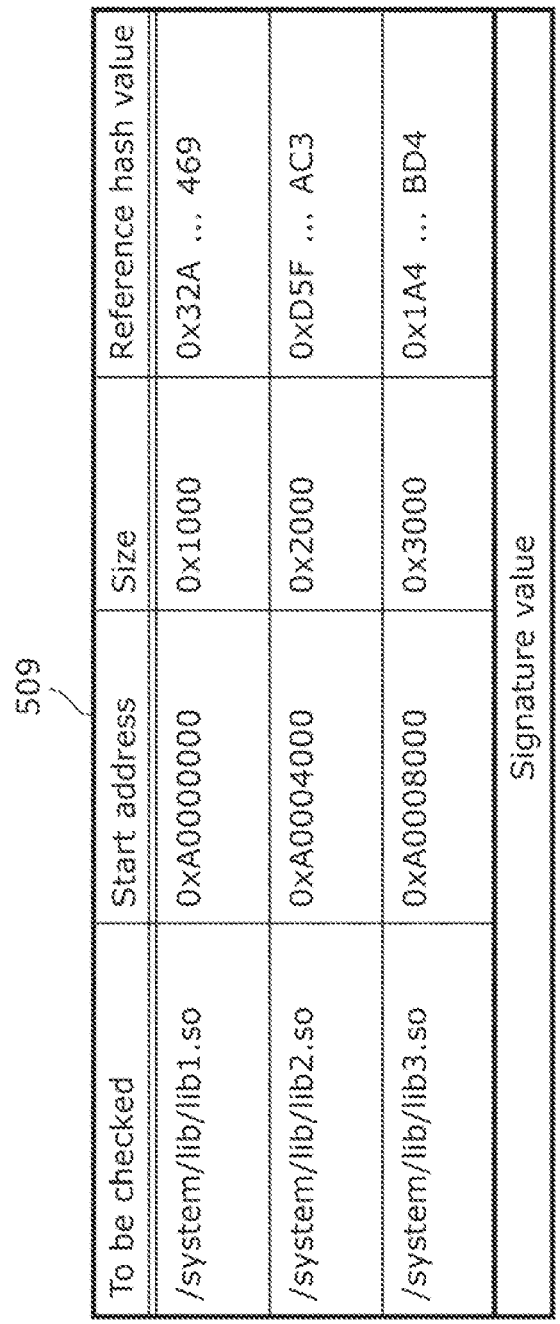
FIG. 10 shows a shared library hash list for a volatile memory according to Embodiment 1 of the present invention.

FIG. 10 specifically shows the shared library for a non-volatile memory 509 in FIG. 5. The shared library hash list for a volatile memory 509 in FIG. 10 contains the file name of a shared library to be checked, the virtual address of the shared library, and reference hash values. Here, the reference hash values are the ones calculated in the hash values generating step in FIG. 8 (S807).

The shared library hash list for a non-volatile memory 509 has a signature given with the secret key 505.

Based on the comparison between (i) the shared library has list for a non-volatile memory 508 and (ii) the information obtained from the shared libraries in the non-volatile memory 100, a tampered shared library in the non-volatile memory 100 is detected. Similarly, based on the comparison between the shared library hash list for a volatile memory 509 in FIFG. 10 and the information obtained from the shared library into the volatile memory 200, a tampered shared library into the volatile memory 200 is detected.

Specifically, the comparison between (i) the information on the hash values previously extracted from the shared libraries and (ii) the information on the hash values extracted from the shared libraries in the non-volatile memory 100 or in the volatile memory 200 makes possible detecting such tampering.

Figure 11:
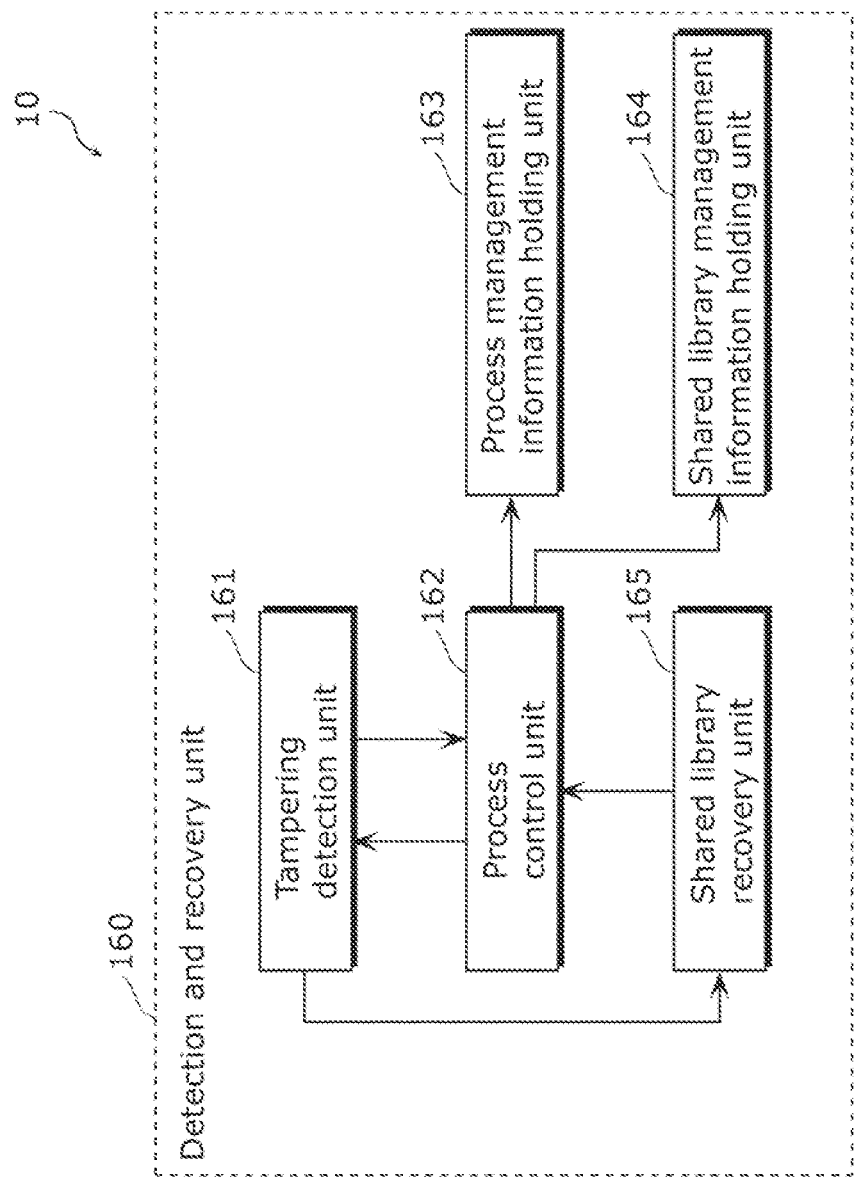
FIG. 11 shows a schematic view of the information processing apparatus according to Embodiment 1 of the present invention.

FIG. 11 shows a schematic view of the information processing apparatus 10 in FIG. 1. In particular, FIG. 11 shows the configuration of the detection and recovery unit 160 in FIG. 1.

The detection and recovery unit 160 includes a tampering detection unit (also referred to as "tampering determination unit") 161, a process control unit 162, and a shared library recovery unit 165. In addition, the detection and recovery unit 160 includes a process management information holding unit (also referred to as "process running information holding unit") 163, and a shared library management information holding unit (also simply referred to as "shared library information holding unit") 164.

While a process is running, the tampering detection unit 161 detects a tampered shared library among the shared libraries loaded in a process space of an application and found in the volatile memory 200.

The process control unit 162 specifies a process using the tampered shared library determined by the tampering detection unit 161. Then, the process control unit 162 temporarily stops the specified process. After that, the shared library recovery unit 165 reloads a shared library from the non-volatile memory 100 into the volatile memory 200. This operation makes the shared library recover from the tampering. After the recovery, the process control unit 162 resumes the once temporarily stopped process.

The process management information holding unit 163 holds process management information (also referred to as "process running information") 1630 in FIG. 13, and stop process context information (also simply referred to as "stop process information") 1631 in FIG. 16. It is noted that the stop process context information may be held in a holding unit other than the process management information holding unit 163.

The shared library management information holding unit 164 holds shared library management information (also simply referred to as "shared library information") 1640 in FIG. 15.

The shared library recovery unit 165 reloads a shared library from the non-volatile memory 100 into the volatile memory 200 to recover the tampered shared library.

It is noted that the detection and recovery unit 160 in the non-volatile memory 100 is loaded into the volatile memory 200 to be used as the detection and recovery unit 260 in FIG. 1. Accordingly, the detection and recovery unit 260 in FIG. 1 works as a functional unit equivalent to the detection and recovery unit 160 in the non-volatile memory 100.

It is noted that in Embodiment 1, the detection and recovery unit 160 in the non-volatile memory 100 is loaded into the volatile memory 200, such that the detection and recovery unit 260 in the volatile memory 200 detects tampering and recovers the tampered shared library. The detection and recovery unit 160 may also be implemented in an electronic circuit in the information processing apparatus 10.

For example, the tampering detection unit 161, the process control unit 162, the process management information holding unit 163, the shared library management information holding unit 164, and the shared library recovery unit 165 may be implemented as an integrated circuit. Among the functional units, only the units for calculation, such as the tampering detection unit 161, the process control unit 162, and the shared library recovery unit 165, may be implemented as an integrated circuit.

Moreover, without loading the detection and recovery unit 160 found in the non-volatile memory 100 into the volatile memory 200, the CPU 410 may directly execute the detection and recovery unit 160.

Furthermore, the information processing apparatus 10 may recover the shared library without managing the process running information. Here, the information processing apparatus 10 does not have to have the process management information holding unit 163 holding the information on the process.

In addition, the process management information holding unit 163 and the shared library management information holding unit 164 is are storage units for holding information. The holding units may have a storage unit in the form of hardware to hold the information, and may store the information in the storage unit. Substantially, those holding units may be provided in one piece of storage unit. The storage unit may store two or more segmented information units.

Figure 12:
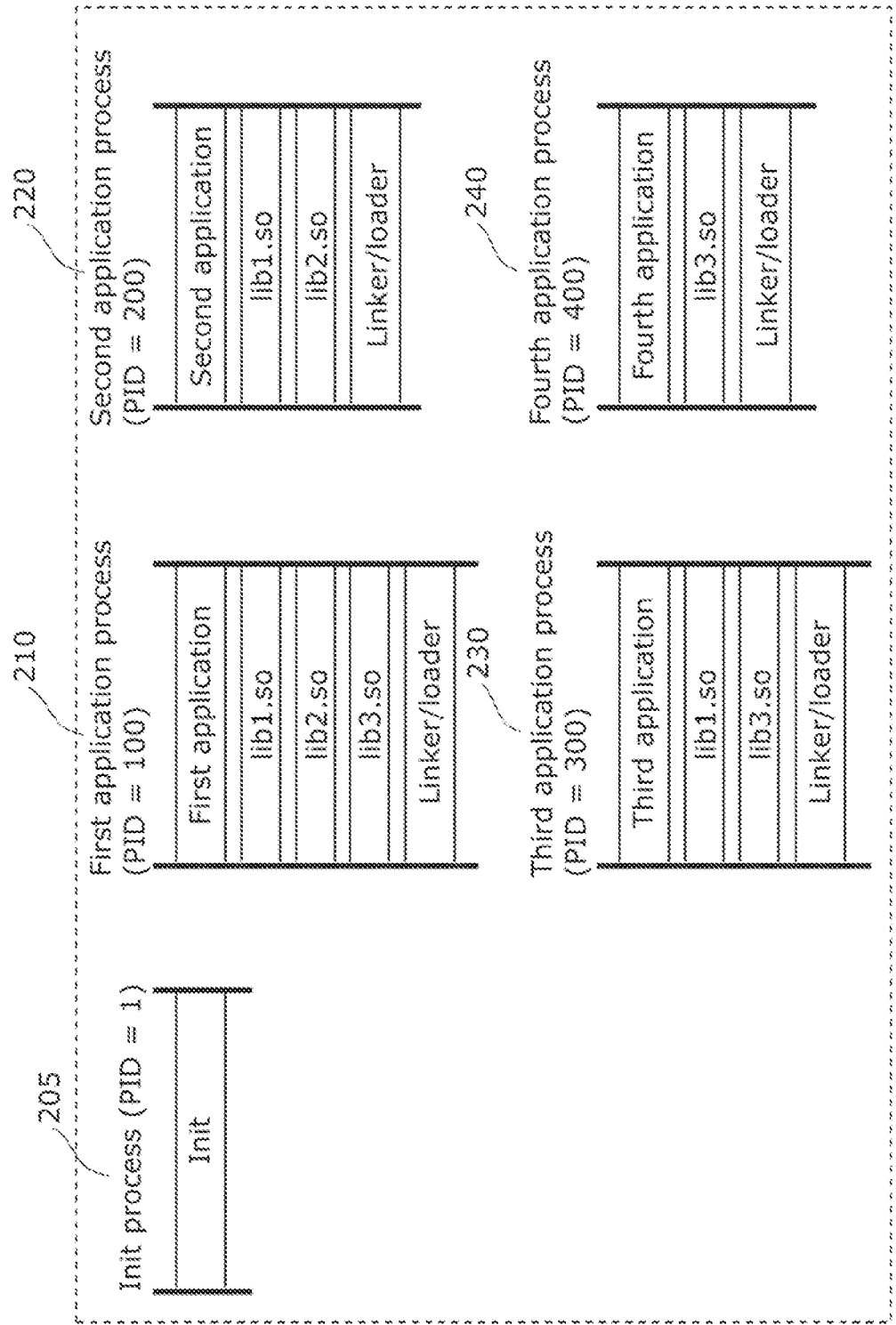
FIG. 12 shows two or more processes running in the information processing apparatus according to Embodiment 1 of the present invention.

FIG. 12 shows two or more processes running in the information processing apparatus 10 in FIG. 1.

FIG. 12 shows an Init process 205, a first application process 210, a second application process 220, a third application process 230, and a fourth application process 240 running for executing various kinds of initialization. As shown in FIG. 12, each of the application processes uses at least one of the first shared library 141, the second shared library 142, and the third shared library 143.

Description hereinafter is given on the premise that two or more processes are running as shown in FIG. 12.

FIG. 13 shows process management information held in the process management information holding unit 163 in FIG. 11.

Process management information 1630 in FIG. 13 includes a process ID for identifying a process, a parent process ID indicating the parent process of the process, and a status indicating whether or not the process is running or is being stopped.

FIG. 13 shows the processes running as shown in FIG. 12. Since all the processes in FIG. 12 are running, all the statuses of the processes are held in "RUN".

FIG. 14 shows process management information held in the process management information holding unit 163 in FIG. 11. The process management information is presented after the tampering has been detected.

For example, the tampering detection unit 161 detects the tampering with lib2. so loaded in the processes having a process ID 100 and a process ID 200. Then, the process control unit 162 temporarily stops the processes having the process ID 100 and the process ID 200. FIG. 14 shows the process management information 1630 presented after the processes having the process ID 100 and the process ID 200 have been temporarily stopped.

In the status of the stopped process, "STOP" is recorded to show that the process has been temporarily stopped. It is noted that in the case where the process has completely stopped, instead of temporarily stopped, the information may be deleted from the process management information 1630. This operation distinguishes a temporal stop from a complete stop.

The process control unit 162 updates the status of the temporarily stopped process to "STOP". Moreover, the process control unit 162 refers to the process management information 1630 after the recovery of the shared library so as to specify the temporarily stopped process. Then, the process control unit 162 resumes the specified process.

The tampering detection unit 161 may specify a running process out of the process management information 1630, and determine whether or not the shared library to be used by the specified process is tampered with.

FIG. 15 shows shared library management information held in the shared library management information holding unit 164 shown in FIG. 11.

Shared library management information 1640 in FIG. 15 includes the file path of a shared library, the virtual address at which the shared library is loaded, and the process ID of a process using the shared library.

For example, the shared library management information 1640 in FIG. 15 shows that /system/lib/lib1.so is loaded at the virtual addresses between 0xA0000000 and 0xA0001000. Furthermore, the shared library management information 1640 shows that each of the processes having a process ID 100, a process ID 200, and a process ID 300 uses /system/lib/lib1. so.

It is noted that the shared library management information 1640 is generated as soon as the shared library is loaded.

Moreover, in Embodiment 1, the shared library is a Prelink library. In contrast, a non-Prelinked library may be subject to the tampering check.

The non-Prelink library does not have a fixed loaded virtual address. Thus, when the non-Prelink library is subject to the tampering check, the shared library management information holding unit 164 may register, in a virtual address field, information which distinguishes the Prelink library from the non-Prelink library. For example, the shared library management information holding unit 164 may set a virtual address field of the non-Prelink library to NULL in the shared library management information 1640.

Moreover, the shared library management information holding unit 164 may separately generate to hold the shared library management information 1640 having no virtual address field.

FIG. 16 shows the stop process context information held in the to process management information holding unit 163 in FIG. 11.

Stop process context information 1631 in FIG. 16 includes information required to resume a stopped process. The stop process context information 1631 includes a process ID to identify the stopped process, and a program counter (PC) a stack pointer (SP), and a frame pointer (FP) found when the process stops. Even though not shown, the stop process context information 1631 may include various kinds of register information items of the CPU 410 which are required to resume the process.

The stop process context information 1631 may also include information on an operation condition of the process. The stop process context information 1631 may also include information on stack; that is, an operation scheme of the process.

The stop process context information 1631 may also include progress information indicating the progress of the process. As described above, the stop process context information 1631 may include information on the PC as the progress information. The stop process context information 1631 may also include operation history information showing an operation history of the process. As described above, the stop process context information 1631 may include the information on the stack as the operation history information.

Then, the process control unit 162 may resume the process, depending on the progress shown in the stop process context information 1631. Furthermore, the process control unit 162 may resume the process with shared library made before use, with reference to the operation history information included in the stop process context information 1631.

Figure 17:
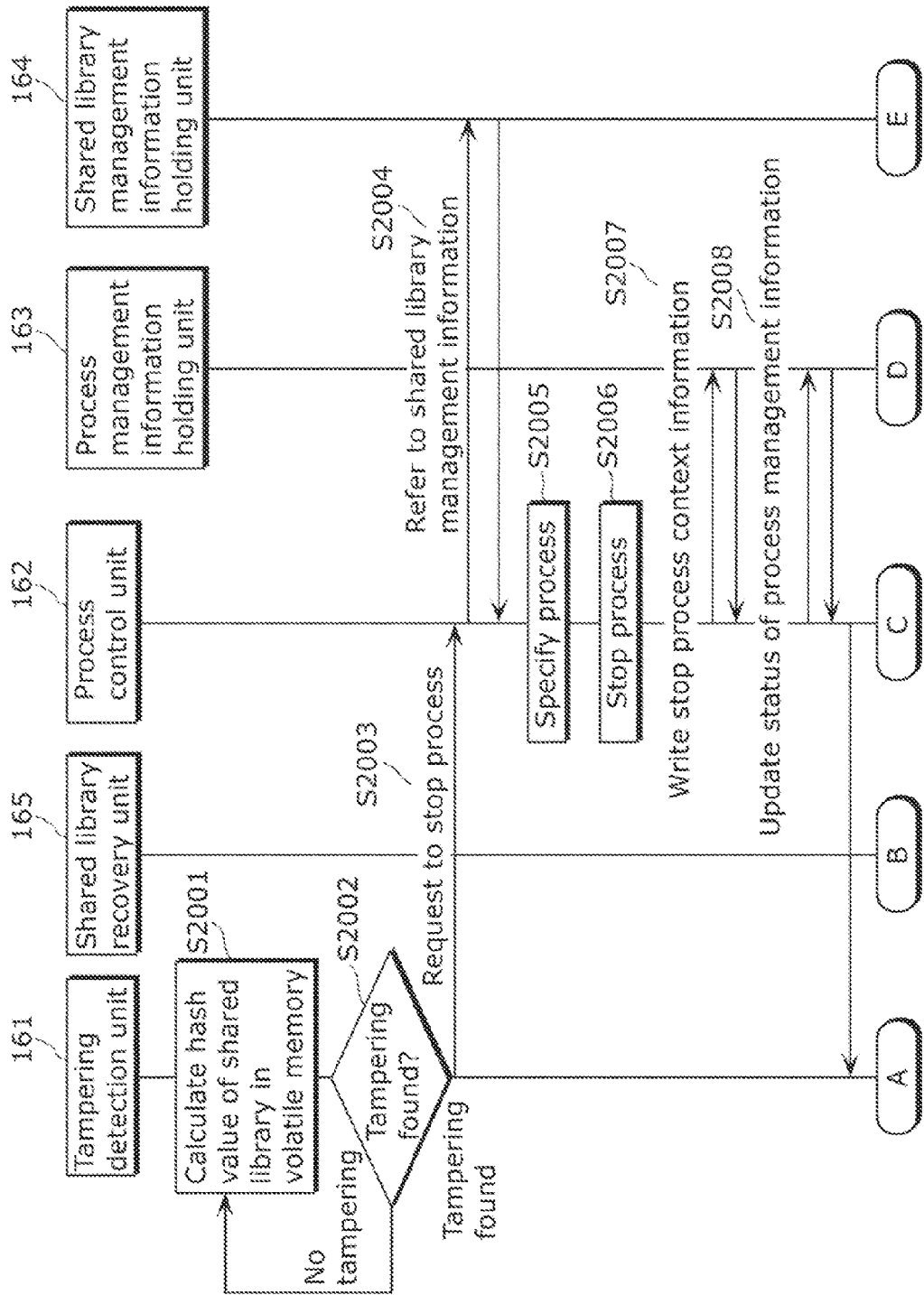
FIG. 17 depicts a sequence diagram showing a recovery operation of the shared library according to Embodiment 1 of the present invention.
Figure 18:
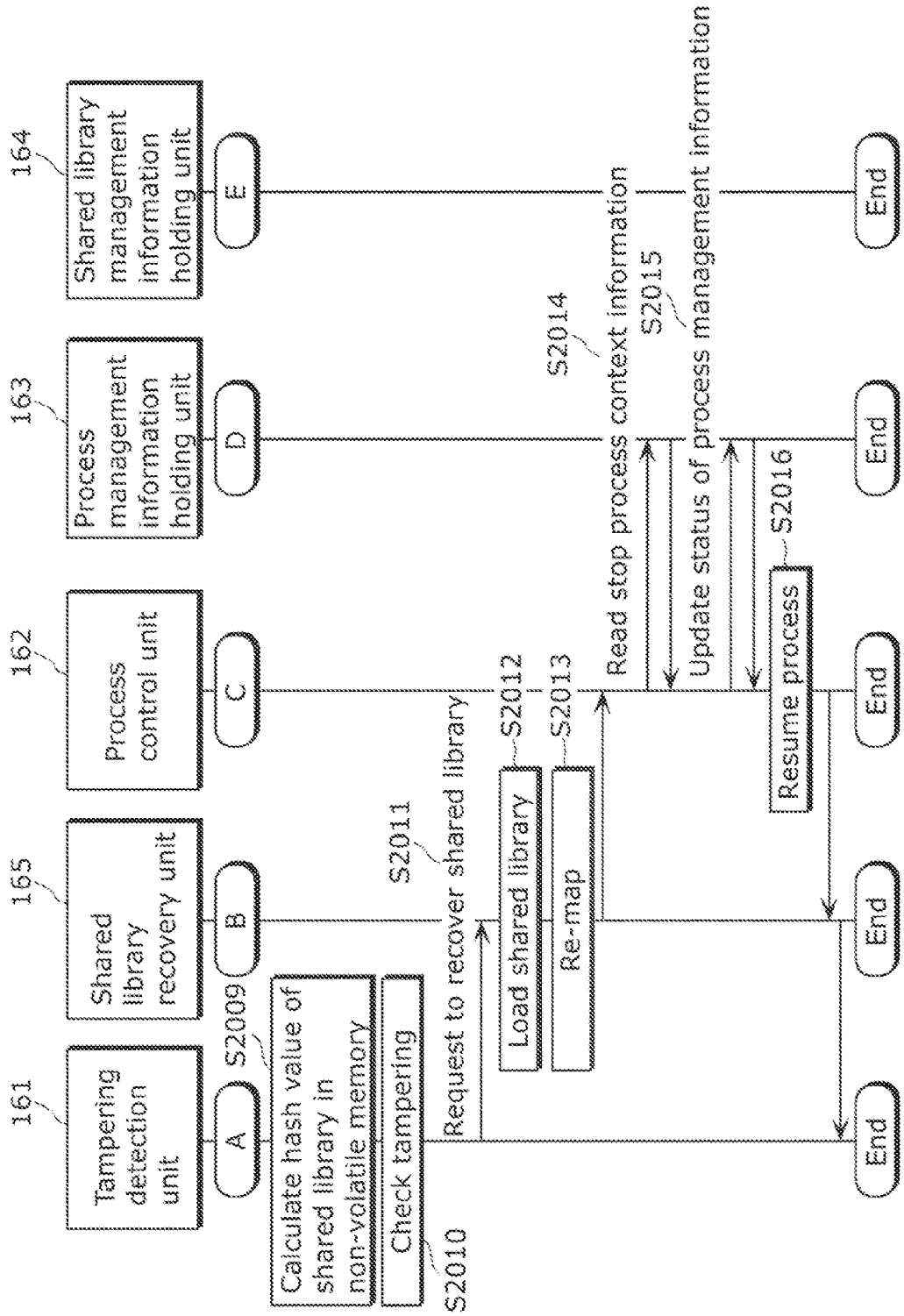
FIG. 18 depicts a sequence diagram showing the recovery operation of the shared library according to Embodiment 1 of the present invention.

FIGS. 17 and 18 depict sequence diagrams showing a recovery operation of the shared library according to Embodiment 1 of the present invention.

Described hereinafter is how to detect tampering with the shared library in the volatile memory 200 and how to recover the tampered shared library, with reference to FIGS. 17 and 18.

First, the tampering detection unit 161 calculates the hash values of a shared library loaded into the volatile memory 200 in the process space (S2001).

Next, the tampering detection unit 161 compares the hash values calculated in the previous step (S2001) with the reference hash values of the shared library hash list for a volatile memory 509 so as to determine whether or not the shared library in the volatile memory 200 is tampered (S2002).

When the determination (S2002) result shows that tampering is found with the shared library, the tampering detection unit 161 requests the process control unit 162 to stop a process which is using the tampered library (S2003).

When the determination (S2002) result shows that no tampering is found with the shared library, the process does not stop and continues to run. The tampering detection unit 161 selects another shared library loaded in another process space as a one to be checked for tampering, and goes back to the hash values calculating step (S2001).

It is noted that the tampering detection unit 161 may carry out the tampering check either (i) periodically on the shared library while the process is running or (ii) with a specific operational timing of the process. The tampering detection unit 161 checks the tampering with the shared library such that the check does not cause any trouble with a desired operation which the process is to run.

Next, the process control unit 162 refers to the shared library management information 1640 held in the shared library management information holding unit 164 (S2004). Then, the process control unit 162 specifies a process which is using the tampered shared library (S2005).

Next, the process control unit 162 stops (S2006) the process specified in the previous step (S2005).

Then, the process control unit 162 generates information required to resume the stopped process in the previous step (S2006) in the form of the stop process context information 1631. Then, the process management information holding unit 163 records the generated stop profess context information 1631 (S2007).

Next, the process control unit 162 updates a status to "STOP" (S2008). Here, the status to be updated is (ii) recorded in the process management information 1630 held in the process management information holding unit 163 and (i) indicating the stopped process.

Next, the tampering detection unit 161 calculates hash values of a shared library in the non-volatile memory 100 (S2009). Here, the shared library corresponds to the shared library (i) determined in the determination step (S2002) as tampered with and (ii) found in the volatile memory 200.

Then, the tampering detection unit 161 compares the hash values calculated in the previous step (S2009) with the reference hash values of the shared library for a non-volatile memory 508 so as to determine whether or not the shared library in the non-volatile memory 100 is tampered with (S2010). When the determination (S2010) result shows that the shared library is tampered with, the information processing apparatus 10 may stop the subsequent steps.

Next, the tampering detection unit 161 requests the shared library recovery unit 165 to recover the tampered shared library (S2011).

Then, the shared library recovery unit 165 unmaps the tampered shared library in the stopped process, and loads a shared library for recovery from the non-volatile memory 100 to the volatile memory 200 (S2012). Then, the shared library recovery unit 165 re-maps the shared library in the process space to recover the tampered shared library (S2013).

Here, even though the shared library is loaded in a physical address which differs from the physical address before the reloading, the remapping allows the process to use the shared library. In contrast, when the shared library is loaded in the same physical address as the physical address before the reloading, the process can use the shared library without remapping. Hence, the shared library recovery unit 165 does not have to remap the shared library in the process space.

Then, the process control unit 162 refers to the stop process context information 1631 recorded in the process management information holding unit 163, and reads information required to resume the stopped process (S2014).

Next, the process control unit 162 updates "STOP" in the process management information 1630 held in the process management information holding unit 163 to "RUN" (S2015).

Finally, the process control unit 162 uses the information read in the reading step (S2014) to resume the temporarily stopped process (S2016).

Before the recovery, the tampering detection unit 161 carries out the tampering check on the shared library in the non-volatile memory 100 (S2009 and S2010). In the case where it is clear that there is no tampering, however, the tampering detection unit 161 does not have to carry out the tampering check.

Moreover, in Embodiment 1, the tampering detection unit 161 carries out the tampering check on the shared library in the volatile memory 200 while the process is running. Specific tampering check timing may be (i) periodical timing while the process is running, (ii) when the process is activated, or (iii) timing with a specific operation. The tampering check timing shall not be limited to those examples.

As described above, only the process using a tampered shared library is temporarily stopped. Thus, the process which is not using a tampered shared library continues to run.

Furthermore, after the tampering detection, the information processing apparatus 10 temporarily stops the process which uses the tampered shared library. This operation minimizes the effect of the tampering.

In addition, the information processing apparatus 10 recovers the tampered shared library so as to recover the process which is using the tampered shared library.

Figure 19:
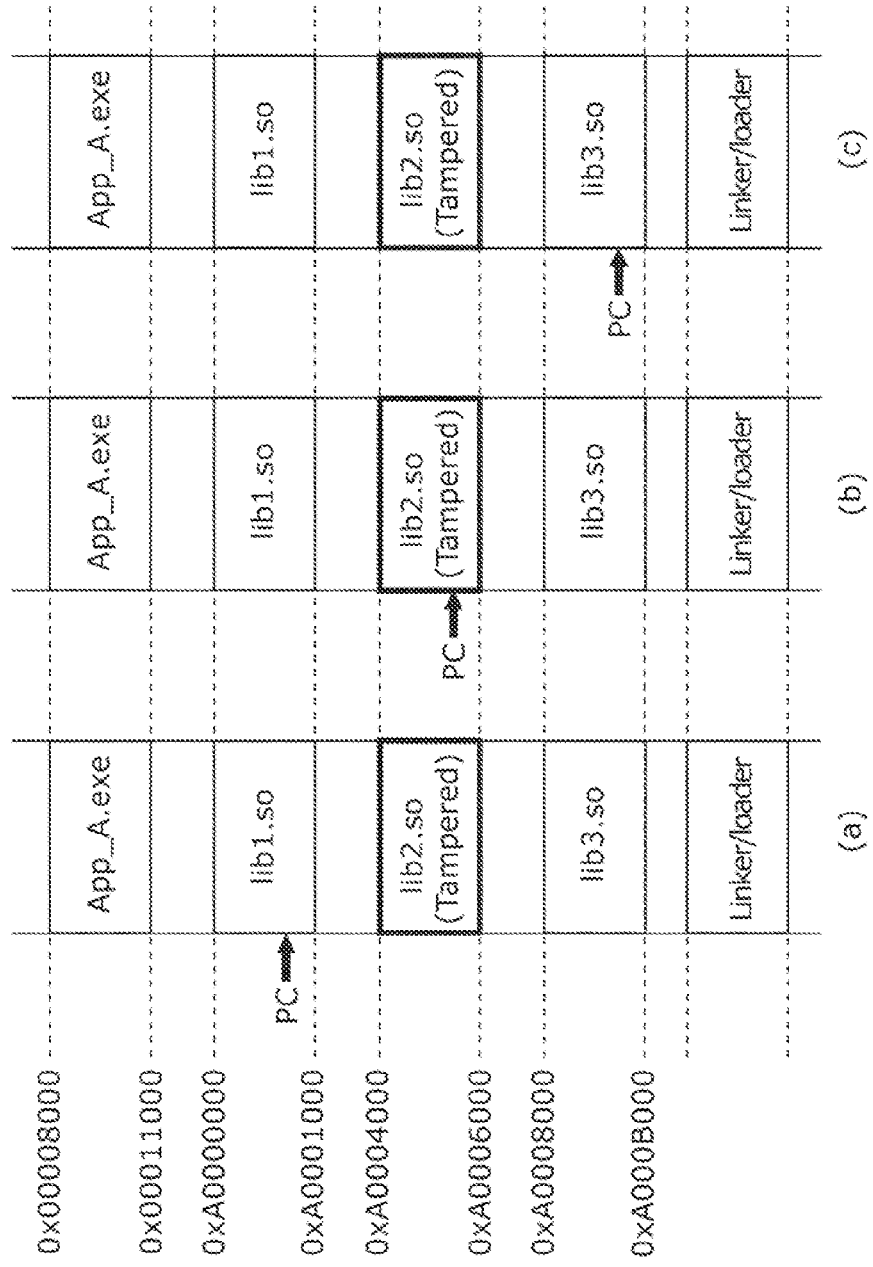
FIG. 19 shows a process space and a program counter when the tampering is detected according to Embodiment 1 of the present invention.
Figure 20:
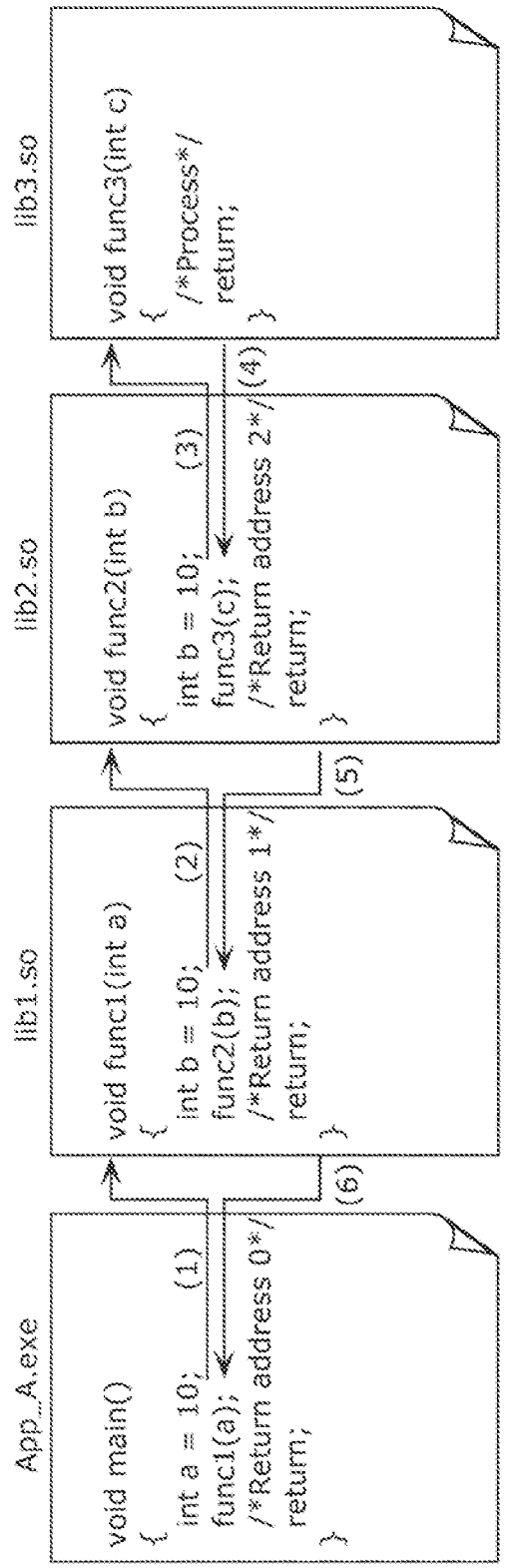
FIG. 20 shows a calling relationship between an application and a shared library according to Embodiment 1 of the present invention.

FIGS. 19 and 20 show the case where (i) a tampered shared library is detected and (ii) the process temporarily stops with different timing.

FIG. 19 shows a process space and a program counter when the tampering with the second shared library 142 (lib2. so) of the first application process 210 is detected. FIG. 20 shows a calling relationship between an application and a shared library.

Here, FIG. 20. exemplifies the calling relationship between (i) App_A.exe in each of the states from (a) to (c) and (ii) each of the shared libraries (lib1. so, lib2. so, and lib3. so) in FIG. 19.

FIG. 19(a) shows the case where tampering with lib2. so is detected before the second shared library 142 (lib2. so) is run. FIG. 19(b) shows the case where tampering with lib2. so is detected while the second shared library 142 (lib2. so) is being run. FIG. 19(c) shows the case where tampering with lib2. so is detected after the second shared library 142 (lib2. so) is run.

Figure 21:
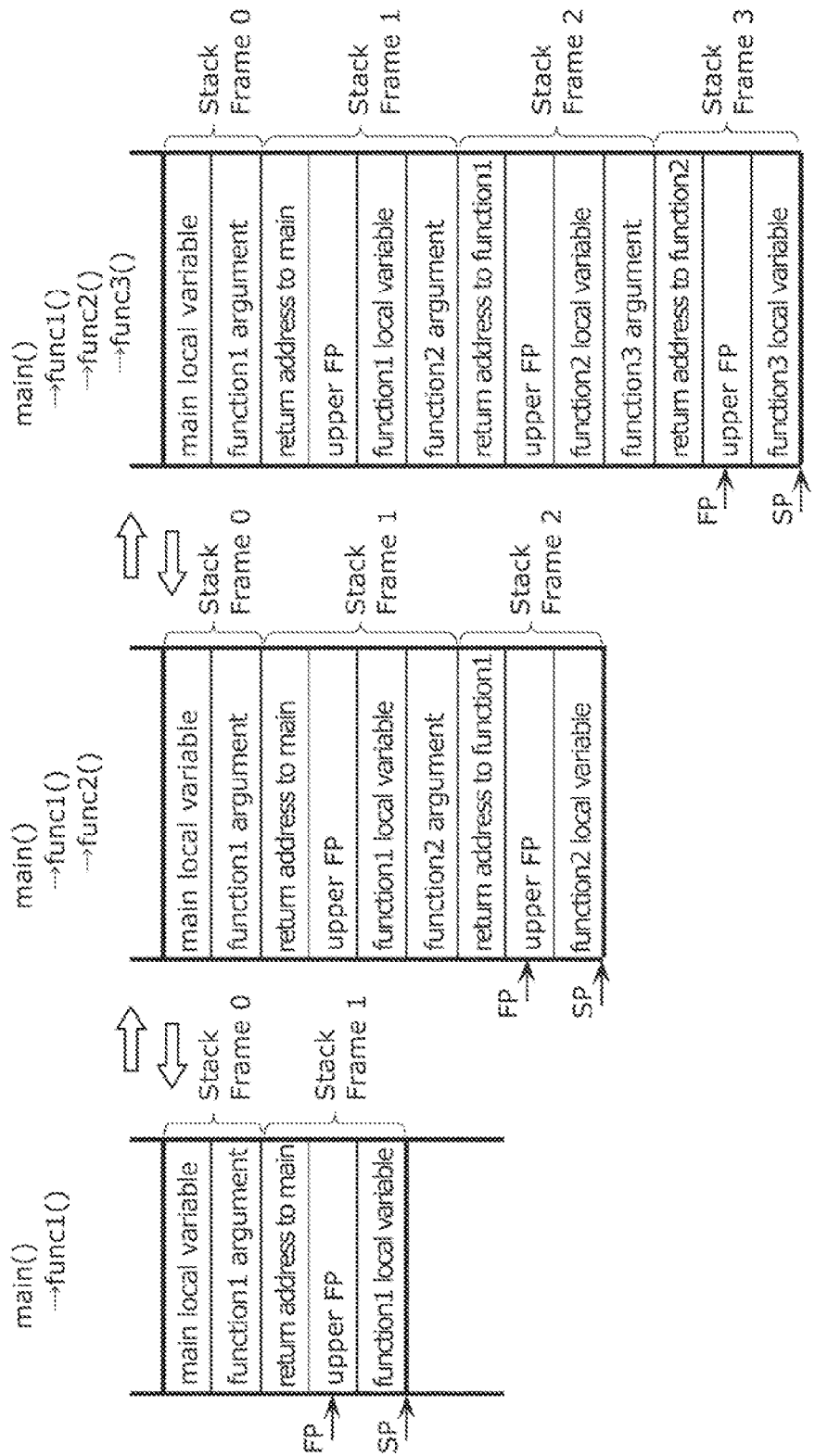
FIG. 21 shows how a stack according to Embodiment 1 of the present invention grows.

FIG. 21 shows how a stack grows in the calling relationship in FIG. 20.

Typical stacks are managed on a stack frame basis. Each of the stack frames includes the following: a local variable required for a function, a return address when calling the function, an argument to be passed when calling the function, the address of an upper frame point, and a not-shown register value of the CPU 410.

Figure 22:
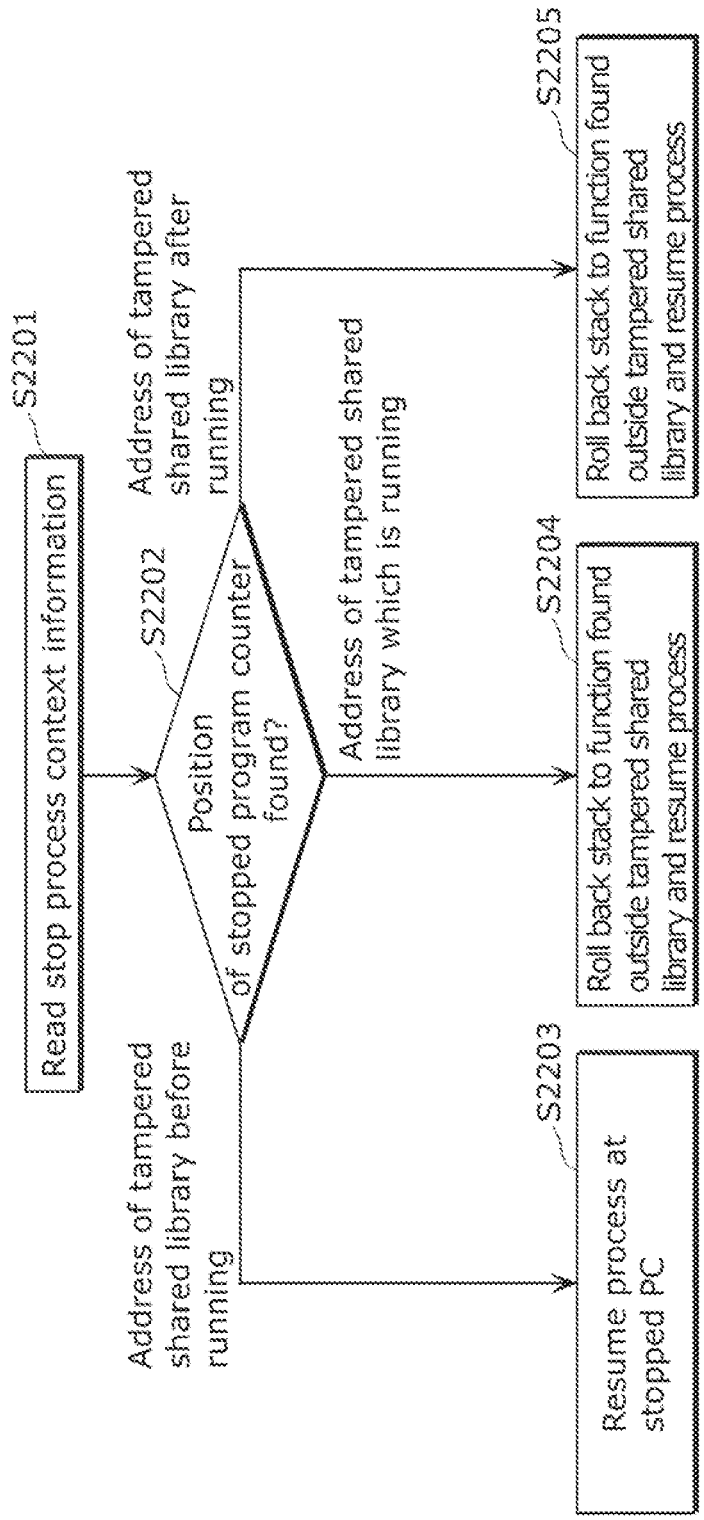
FIG. 22 depicts a flowchart showing how the process is resumed according to Embodiment 1 of the present invention.

FIG. 22 depicts a flowchart showing how a stopped process is resumed. FIG. 22 also corresponds to the operations after the reading step (S2014) in FIG. 18. When the tampering is detected and the process stops, the stopped process is resumed based on an address shown by the PC of the process as shown in FIG. 22.

First, the process control unit 162 reads the stop process context information 1631 held by the process management information holding unit 163 (S2201).

Then, the process control unit 162 determines the location of the PC when the process stopped (S2202).

When the determination (S2202) result shows that the PC indicated by the stop process context information 1631 is the address of the tampered library before running, the process control unit 162 resumes the process at the stopped PC (S2203).

When the determination (S2202) result shows that the PC indicated by the stop process context information 1631 is the address of the tampered library which is running, the process control unit 162 resumes the process in the state where the tampered shared library is before running. Thus, the process control unit 162 rolls back the stack frame up to the point before the shared library runs, and resumes the process (S2204).

When the determination (S2202) result shows that the PC indicated by the stop process context information 1631 is the address of the tampered library after running, the process control unit 162 resumes the process with the tampered shared library made before running. Thus, the process control unit 162 rolls back the stack frame up to the point before the shared library runs, and resumes the process (S2205).

The process control unit 162 can roll back the stack frame with reference to the SP and the FP in FIG. 21. Non-Patent Reference 3 "How Debuggers Work" specifically shows how to roll back stacks, and the details thereof shall be omitted.

Thus, the process control unit 162 successfully rolls back the stack until no tampering is found in the shared library, and resumes as the process even though the tampered shared library is being run or has already been run. This operation ensures running of the process with a tampering-free shared library.

That ends the description of Embodiment 1.

(Embodiment 2)

Described next is an information processing apparatus according to Embodiment 2 of the present invention.

A shared library is loaded among two or more process spaces. Even though each of the shared libraries has a different virtual address mapped in a corresponding process, the shared libraries correspond to a single physical address. Thus, when a tampering check is carried out for each process, one shared library inevitably takes two or more tampering checks. In other words, the tampering checks are redundantly conducted on the same physical address, which decreases the efficiency of the tampering checks.

Embodiment 2 proposes a technique to carry out an efficient and comprehensive tampering check. In Embodiment 2, the operations of tampering detection and recovery are similar to those in Embodiment 1, and the description thereof shall be omitted.

Figure 23:
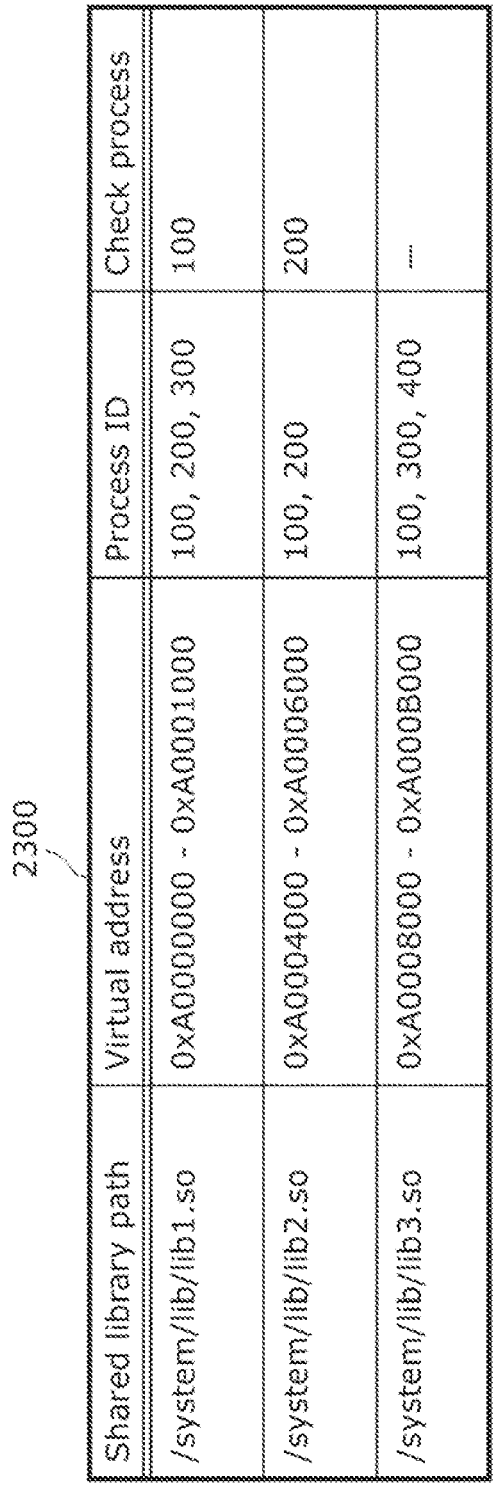
FIG. 23 shows shared library management information according to Embodiment 2 of the present invention.
Figure 24:
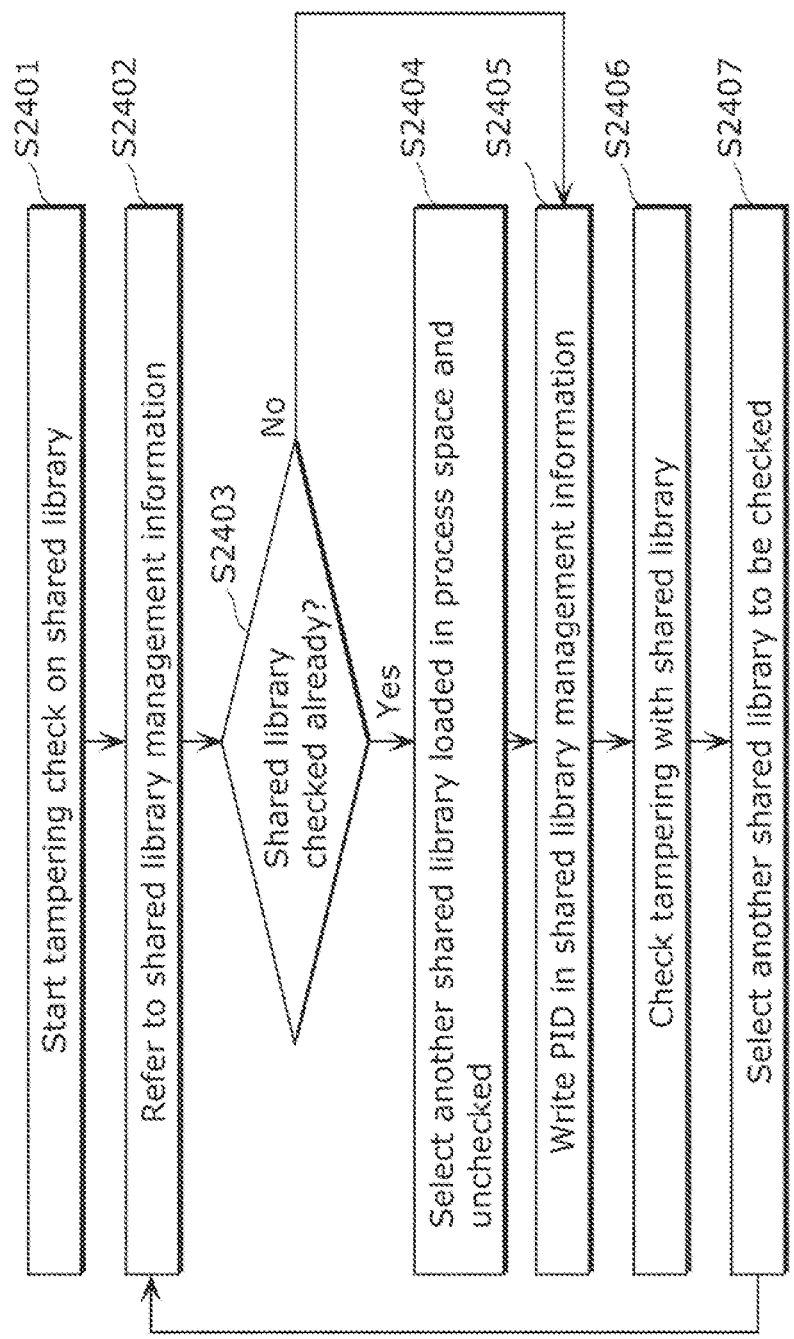
FIG. 24 depicts a flowchart showing how to execute a tampering check on the shared library according to Embodiment 2 of the present invention.

With reference to FIGS. 23 and 24, described hereinafter are differences between the tampering check according to Embodiment 2 and that according to Embodiment 1.

FIG. 23 shows shared library management information according to Embodiment 2. Compared with the shared library management information 1640 according to Embodiment 1 in FIG. 15, shared library management information 2300 in FIG. 23 has an extra field for the check process. The field records the process ID of a process whose shared library has been mapped in a process space and has taken the tampering check.

FIG. 23 exemplifies that lib1. so is loaded in three of processes each having a process ID 100, a process ID 200, and a process ID 300. When the shared library whose process having the process ID 100 is checked, tampering with lib1. so is checked as well.

Moreover, lib2. so is loaded in two of the processes; namely, the process ID 100, and the process ID 200. When the shared library whose process having the process ID 200 is checked, tampering with lib2. so is checked as well. Furthermore, lib3. so is loaded in three of the processes; namely, the process ID 100, the process ID 300, and the process ID 400. In any of the processes, lib3. so has not taken the tampering check yet.

FIG. 24 depicts a flowchart showing how to execute a tampering check according to Embodiment 2 of the present invention.

First, the tampering detection unit 161 starts the tampering check on a shared library in the volatile memory 200 (S2401).

Next, the tampering detection unit 161 refers to the shared library management information 2300 (S2402).

Then, the tampering detection unit 161 refers to the shared library management information 2300 to determine whether or not the shared library to be checked for tampering has already been checked in another process (S2403).

When the determination (S2403) shows that the shared library to be checked for tampering has not taken a tampering check in any of the processes, the tampering detection unit 161 writes a process ID to the shared library management information 2300 (S2405). Then, the tampering detection unit 161 conducts the tampering check of the shared library (S2406).

In contrast, when the determination (S2403) shows that the shared library to be checked for tampering has been checked in another process, the tampering detection unit 161 selects another shared library (S2404). In selecting a shared library to be checked for tampering, the tampering detection unit 161 selects the shared library (i) which has already been loaded in the process space and (ii) which has not taken the tampering check yet in the shared library management information 2300.

Next, the tampering detection unit 161 writes, in the check process field of the shared library management information 2300, the process ID of the process whose shared library has already been checked.

Then, the tampering detection unit 161 checks whether or not the shared library, selected in the previous step (S2404) and subject to the tampering check, is tampered with (S2406). When the shared library is found tampered, the shared library recovery unit 165 recovers the tampered shared library.

Next, the tampering detection unit 161 selects another shared library loaded in the process space as the one to be checked for tampering (S2407). Then, the tampering detection unit 161 again refers to the shared library management information 2300 (S2402).

The above flow makes it possible to conduct efficient tampering checks on a shared library loaded in two or more process spaces.

That ends the description of Embodiment 2.

(Embodiment 3)

As Embodiment 3, characteristic constitutional features in Embodiments 1 and 2 shall be described hereinafter. The information processing apparatus according to Embodiment 3 loads a shared library stored in a non-volatile memory in a volatile memory, and run a process which uses the loaded shared library. Described hereinafter are a configuration and operations of the information processing apparatus according to Embodiment 3 which alleviate effects caused by tampering with a shared library loaded into the volatile memory.

Figure 25:
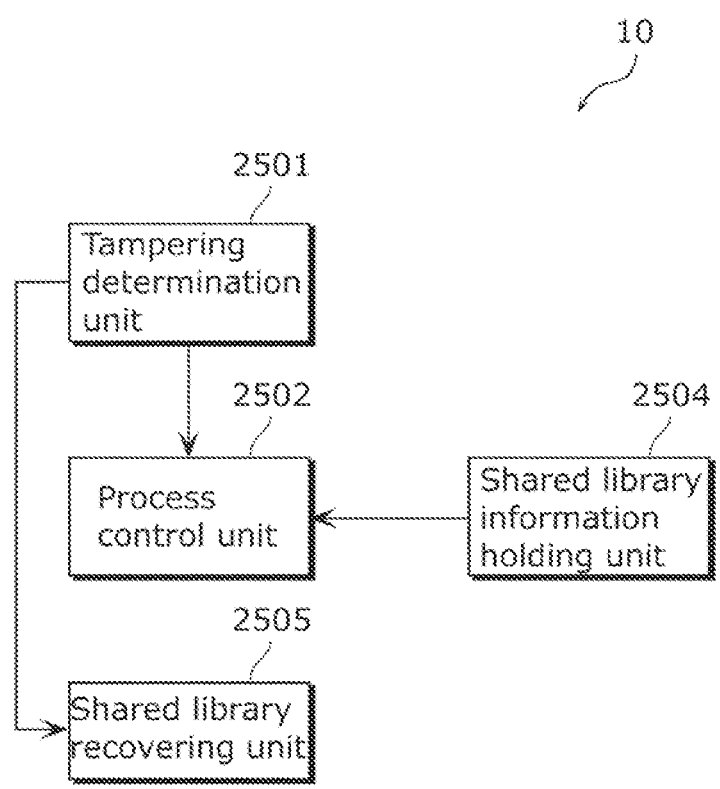
FIG. 25 shows a schematic view of an information processing apparatus according to Embodiment 3 of the present invention.

FIG. 25 shows the schematic view of the information processing apparatus according to Embodiment 3. The information processing apparatus 10 in FIG. 25 includes a tampering determination unit 2501, a shared library information holding unit 2504, a process control unit 2502, and a shared library recovering unit 2505.

The tampering determination unit 2501 determines whether or not a shared library in the volatile memory is tampered with.

The shared library information holding unit 2504 holds shared library information. The shared library information includes information on a correspondence relationship between a shared library in the volatile memory and a process using the shared library.

When the tampering determination unit 2501 determines that a shared library in the volatile memory has been tampered with, the process control unit 2502 refers to shared library information to specify a process which uses the tampered shared library. Then, the process control unit 2502 stops the specified process.

When the tampering determination unit 2501 determines that a shared library in the volatile memory is, the shared library recovering unit 2505 reloads the shared library in the non-volatile memory into the volatile memory to recover the tampered shared library.

The tampering determination unit 2501, the process control unit 2502, and the shared library recovering unit 2505 included in the information processing apparatus 10 in FIG. 25 may be provided in a form of an integrated circuit. The shared library information holding unit 2504 for holding information may be provided as another memory.

Figure 26:
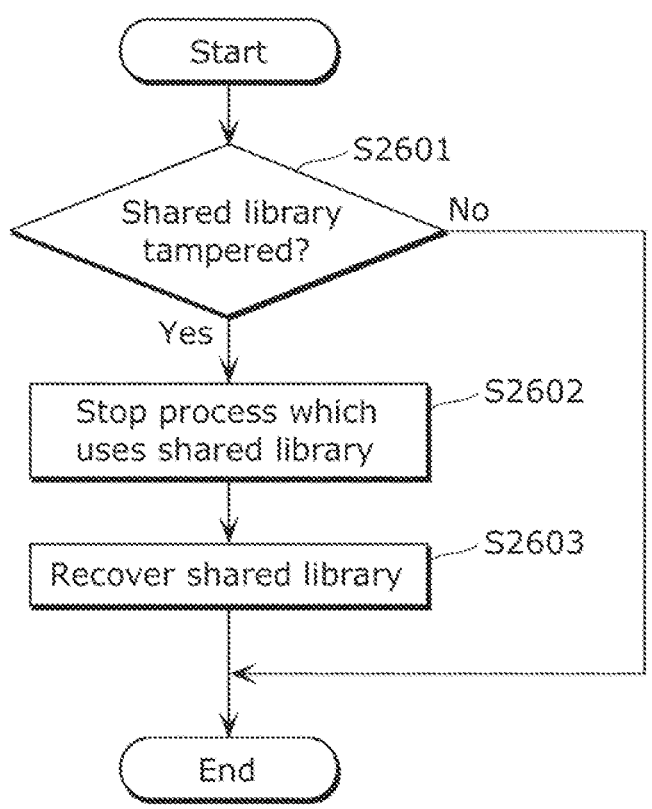
FIG. 26 depicts a flowchart showing how the information processing apparatus according to Embodiment 3 of the present invention operates.

FIG. 26 depicts a flowchart showing how the information processing apparatus 10 in FIG. 25 operates. The tampering determination unit 2501 determines whether or not a shared library in the volatile memory is tampered with (S2601). When the shared library in the volatile memory is not tampered with (S2601: No), the information processing apparatus 10 ends its operation.

When the shared library in the volatile memory is tampered with (S2601: Yes), the process control unit 2502 refers to the shared library information in the shared library information holding unit 2504 to specify a process which is using the tampered shared library in the volatile memory. Then, the process control unit 2502 stops the specified process (S2602).

Then, the shared library recovering unit 2505 reloads a shared library in the non-volatile memory into the volatile memory to recover the tampered shared library in the volatile memory (S2603).

The above operation stops the process to be affected by the tampered shared library. Hence, the information processing apparatus 10 according to Embodiment 3 successfully reduces the effect of tampering. The shared library in the volatile memory is recovered, using a shared library in the non-volatile memory. This feature reduces the risk of a repetitive use of the tampered shared library.

As described above, the information processing apparatus 10 according to Embodiments 1 to 3 temporarily stops a process whose shared library, loaded into the volatile memory 200, is detected tampered with. Then, the information processing apparatus 10 reloads a shared library in the non-volatile memory 100 into the volatile memory 200 to recover the shared library.

Here, the shared library in a process space is subject to the tampering check and recovery. Thus, the process runs under the protection. Hence, the information processing apparatus 10 is useful when completeness needs to be assured in running a process. For example, the information processing apparatus 10 can be used for personal computers, tablet personal computers, TVs, and cellular phones which run various programs.

It is noted that the information processing apparatus 10 may reload the shared library in a non-volatile memory 100 into the volatile memory 200 without stopping the process, and may remap the reloaded shared library.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications, including the modifications below, are intended to be included within the scope of this invention.

(1) The aforementioned apparatus is, specifically, a computer system including a microprocessor, a ROM, a RAM, a hard disk unit, a display unit, a keyboard, a mouse, and so on. A computer program is stored in the RAM or hard disk unit. The apparatus achieves its functions through the microprocessor's operation according to the computer program.

Here, the computer program is configured by combining plural instruction codes indicating instructions for the computer.

(2) A part or all of the constituent elements constituting the respective apparatuses may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the RAM. The System-LSI achieves its functions through the microprocessor's operation according to the computer program.

Furthermore, each unit of the constituent elements configuring the respective apparatuses may be made as separate individual chips, or as a single chip to include a part or all thereof.

Furthermore, here, System-LSI is mentioned but there are instances where, due to a difference in the degree of integration, the designations IC, LSI, super LSI, and ultra LSI are used. Furthermore, the means for circuit integration is not limited to an LSI, and implementation with a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if integrated circuit technology that replaces LSI appears thorough progress in semiconductor technology or other derived technology, that technology can naturally be used to carry out integration of the constituent elements. Biotechnology is anticipated to apply.

(3) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and so on. The IC card or the module may also be included in the aforementioned super-multi-function LSI.

The IC card or the module achieves its function through the microprocessor's operation according to the computer program. The IC card or the module may also be implemented to be tamper-resistant.

(4) The present invention may be a method described above, may be a computer program for realizing the previously illustrated method, using a computer, and may also be a digital signal including the computer program.

Furthermore, the present invention may also be realized by storing the computer program or the digital signal in a non-transitory computer-readable recording medium such as flexible disc, a hard disk, a CD-ROM, an MO, a DVD, a DVD-ROM, a DVD-RAM, a BD (Blu-ray Disc), and a semiconductor memory. Furthermore, the present invention also includes the digital signal recorded in these recording media.

Furthermore, the present invention may also be realized by the transmission of the aforementioned computer program or digital signal via a telecommunication line, a wireless or wired communication line, a network represented by the Internet, a data broadcast and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible. The independent computer system may implement the method introduced in the present invention according to the computer program or to the digital signal.

(5) Arbitrary combinations of the aforementioned modifications and embodiment are included within the scope of this invention.

[Industrial Applicability]

The present invention is capable of running a program under protection, and thus is useful for personal computers, tablet personal computers, TVs, cellular phones, and consumer electronics which run programs.

[Reference Signs List]

10 Information processing apparatus
100 Non-volatile memory
110 First application
120 Second application
130 Linker/loader
141 First shared library
142 Second shared library
143 Third shared library
150 and 250 OS
160 and 260 Detection and recovery unit
161 and 2501 Tampering detection unit (Tampering determination unit)
162 and 2502 Process control unit
163 Process management information holding unit (Process information holding unit)
164 and 2504 Shared library management information holding unit (Shared library information holding unit)
165 and 2505 Shared library recovery unit
170 Hash list holding unit
180 Key holding unit
200 Volatile memory
205 Init process
210 First application process
220 Second application process
230 Third application process
240 Fourth application process
300 System LSI
400 Guarded memory
410 CPU
420 IPL
430 Switching management unit
440 Secure boot unit
450 Secure OS
460 Secure application
501 Source code
502 Compiler
503 Linker
504 Shared library
505 Secret key
506 Prelink map
507 Hash list creating tool
508 Shared library hash list for a non-volatile memory
509 Shared library hash list for a volatile memory
1630 Process management information (Process running information)
1631 Stop process context information (Stop process information)
1640 and 2300 Shared library management information (Shared library information)

The invention claimed is:

1. An information processing apparatus which loads a shared library stored in a non-volatile memory into a volatile memory, and runs a process which uses the shared library loaded into the volatile memory, said information processing apparatus comprising:
    a tampering determination unit configured to determine whether or not the shared library in the volatile memory is tampered with;
    a shared library information holding unit configured to hold shared library information including information on a correspondence relationship between the shared library in the volatile memory and the process which uses the shared library in the volatile memory;
    a process control unit configured to, in the case where the determination shows that the shared library in the volatile memory is tampered with, (i) specify the process which uses the shared library in the volatile' emory with reference to the shared library information and (ii) stop the specified process; and
    a shared library recovering unit configured to, in the case where the determination shows that the shared library in the volatile memory is tampered with, reload the shared library in the non-volatile memory into the volatile memory so as to recover the shared library in the volatile memory.

2. The information processing apparatus according to any claim 1, further comprising
    a process running information holding unit configured to hold process running information indicating whether or not the process is running, wherein said tampering determination unit is configured to (i) specify the process which is running with reference to the process running information and (ii) determine whether or not the shared library which the specified process uses is tampered with.

3. The information processing apparatus according to any claim 1, wherein said tampering determination unit is configured to determine whether or not the shared library in the volatile memory is tampered with by comparing (i) information previously extracted from the shared library before the shared library is loaded into the volatile memory with (ii) information extracted from the shared library in the volatile memory after the shared library is loaded into the volatile memory.

4. The information processing apparatus according to claim 1
wherein said tampering determination unit is further configured to determine whether or not the shared library in the non-volatile memory is tampered with, and,
in the case where the determination shows that (i) the shared library in the volatile memory is tampered with and (ii) the shared library in the non-volatile memory is not tampered with, said shared library recovering unit is configured to recover the shared library in the volatile memory.

5. The information processing apparatus according to claim 1,
wherein said shared library information holding unit is configured to hold the shared library information including information indicating whether or not determination is made to show whether or not the shared library in the volatile memory is tampered with, and
said tampering determination unit is configured to (i) specify the shared library to which the determination is not made with reference to the shared library information and (ii) determine whether or not the specified shared library is tampered with.

6. The information processing apparatus according to claim 1,
wherein, when said tampering determination unit determines that the shared library in the volatile memory is tampered with, said shared library recovering unit is configured to recover the shared library in the volatile memory by reloading the shared library in the non-volatile memory into the volatile memory so as to map (i) a physical address of the shared library reloaded into the volatile memory and (ii) a virtual address of the shared library in a process space of the process.

7. The information processing apparatus according to claim 1,
wherein said process control unit is further configured to resume the process after the recovery of the shared library in the volatile memory.

8. The information processing apparatus according to any claim 7, further comprising
a process running information holding unit configured to hold process running information indicating whether or not the process is running,
wherein said process control unit is configured to
(i) update the process running information when said process control unit stops the process such that the process running information indicates that the process is not running and,
after the recovery of the shared library in the volatile memory, (ii) specify the process which is not running with reference to the process running information and (iii) resume the specified process.

9. The information processing apparatus according to any claim 7, further comprising
a process running information holding unit configured to hold process running information indicating whether or not the process is running,
wherein said tampering determination unit is configured to (i) specify the process which is running with reference to the process running information and (ii) determine whether or not the shared library which the specified process uses is tampered with, and
said process control unit is configured to
(i) update the process running information when said process control unit stops the process such that the process running information indicates that the process is not running and
after the recovery of the shared library in the volatile memory, (ii) specify the process which is not running with reference to the process running information and (iii) resume the specified process.

10. The information processing apparatus according to claim 7,
wherein said process control unit is configured to
(i) generate stop process information to be used for resuming the process when said process control unit stops the process and
(ii) resume the process after the recovery of the shared library in the volatile memory, using the stop process information.

11. The information processing apparatus according to claim 10, wherein said process control unit is configured to
(i) generate the stop process information including progress information indicating progress of the process when said process control unit stops the process and
(ii) resume the process after the recovery of the shared library in the volatile memory, depending on the progress indicated by the stop process information.

12. The information processing apparatus according to claim 11,
wherein said process control unit is configured to generate the stop process information including information on a program counter to be used for the process as the progress information.

13. The information processing apparatus according to claim 11,
wherein, after the recovery of the shared library, said process control unit is configured to
(i) resume the process in the progress when the progress indicated by the stop process information shows that the shared library is before use and
(ii) resume the process with the shared library made before use when the progress indicated by the stop process information shows that the shared library is in use or after use.

14. The information processing apparatus according to claim 13,
wherein said process control unit is configured to
(i) generate the stop process information including operation history information indicating an operation history of the process when said process control unit stops the process, and
when, after the recovery of the shared library, the progress indicated by the stop process information shows that the shared library is in use or after use, (ii) resume the process with the shared library made before use, with reference to the operation history information included in the stop process information.

15. The information processing apparatus according to claim 14, wherein said process control unit is configured to generate the stop process information including information on a stack to be used for the process as the operation history information.

16. An information processing method for loading a shared library stored in a non-volatile memory into a volatile memory, and running a process which uses the shared library loaded into the volatile memory, said information processing method comprising:

determining whether or not the shared library in the volatile memory is tampered with;

in the case where said determining shows that the shared library in the volatile memory is tampered with, (i) specifying the process which uses the shared library in the volatile memory with reference to the shared library information and (ii) stopping the specified process, the shared library information being held in a shared library information holding unit for holding shared library information including information on a corresponding relationship between the shared library in the volatile memory and the process which uses the shared library in the volatile memory; and in the case where said determining shows that the shared library in the volatile memory is tampered with, reloading the shared library in the non-volatile memory into the volatile memory so as to recover the shared library in the volatile memory.

17. A non-transitory computer-readable recording medium which stores a program for causing a computer to execute steps included in said information processing method according to claim 16.

18. An integrated circuit which loads a shared library stored in a non-volatile memory into a volatile memory, and runs a process which uses the shared library loaded into the volatile memory, said integrated circuit comprising:

a tampering determination unit configured to determine whether or not the shared library in the volatile memory is tampered with;

a process control unit configured to, in the case where the determination shows that the shared library in the volatile memory is tampered with, (i) specify the process which uses the shared library in the volatile memory with reference to the shared library information and (ii) stop the specified process, the shared library information being held in a shared library information holding unit for holding shared library information including information on a corresponding relationship between the shared library in the volatile memory and the process which uses the shared library in the volatile memory; and a shared library recovering unit configured to, in the case where the determination shows that the shared library in the volatile memory is tampered with, reload the shared library in the non-volatile memory into the volatile memory so as to recover the shared library in the volatile memory.

* * * * *